(12) United States Patent
Heideman et al.

(10) Patent No.: US 7,873,868 B1
(45) Date of Patent: Jan. 18, 2011

(54) METHOD FOR OBTAINING HIGHER THROUGHPUT IN A COMPUTER SYSTEM UTILIZING A CLUSTERED SYSTEMS MANAGER

(75) Inventors: Michael J. Heideman, New Brighton, MN (US); Dennis R. Konrad, Welch, MN (US); David A. Novak, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 2067 days.

(21) Appl. No.: 10/346,456

(22) Filed: Jan. 17, 2003

(51) Int. Cl.
*G06F 11/00* (2006.01)
(52) U.S. Cl. .......................... 714/10; 711/113
(58) Field of Classification Search .................. 714/13, 714/15, 10, 11; 711/113, 133, 136
See application file for complete search history.

(56) References Cited

U.S. PATENT DOCUMENTS

| | | | |
|---|---|---|---|
| 5,940,826 A | 8/1999 | Heideman et al. | 707/8 |
| 5,949,970 A * | 9/1999 | Sipple et al. | 714/15 |
| 2002/0078299 A1* | 6/2002 | Chiou et al. | 711/119 |
| 2002/0120710 A1* | 8/2002 | Chintalapati et al. | 709/216 |
| 2003/0084140 A1* | 5/2003 | Takeuchi et al. | 709/223 |
| 2003/0093647 A1* | 5/2003 | Mogi et al. | 712/1 |
| 2003/0149843 A1* | 8/2003 | Jarvis et al. | 711/133 |
| 2003/0200386 A1* | 10/2003 | Hertz et al. | 711/113 |
| 2003/0217114 A1* | 11/2003 | Obara et al. | 709/214 |
| 2007/0011400 A1* | 1/2007 | Inoue | 711/113 |
| 2007/0022247 A1* | 1/2007 | Fujimoto et al. | 711/113 |

OTHER PUBLICATIONS

Aberdeen Group, Inc. Profile: Unisys ES7000 Server Delivers a Robust, Scalable SAP Solution for Windows 2000 with Outstanding Price-Performance. Jun. 2001. Aberdeen Group Inc. pp. 1-3.*

* cited by examiner

*Primary Examiner*—Dieu-Minh Le
(74) *Attorney, Agent, or Firm*—Robert P. Marley; Mawrocki, Rooney & Sivertson

(57) ABSTRACT

An apparatus for and method of enhancing reliability and performance within a cluster lock processing system having a relatively large number of commodity instruction processors which are managed by a highly scalable, off the shelf platform. Because the commodity processors have virtually no system viability features such as memory protection, failure recovery, etc., the cluster/lock processors assume the responsibility for providing these functions. The low cost of the commodity instruction processors makes the system almost linearly scalable. The cluster/locking, caching, and mass storage accessing functions are fully integrated into a single hardware platform which performs the role of the cluster/lock master. The validity operation throughput of the clustered systems manager is increased by aging out validity entries for each of the process owners via a background operation. This minimizes the number of exclusive locks that must be utilized while performing a validity operation.

20 Claims, 20 Drawing Sheets

| Data Structure Definition |
|---|
| Segment Descriptor Pointer Table |
| Segment Descriptors |
| Segment Data |
| Process Index Table |
| Lock Index Table |
| Sub-Application Table |
| Validity Index Table |
| Recovery In Progress Table |
| Message Control Table |
| Head-of-Host Table (w/o message buffers) |
| Message Buffers  |

Miscellaneous Information

METHOD FOR OBTAINING HIGHER THROUGHPUT IN A COMPUTER SYSTEM UTILIZING A CLUSTERED SYSTEMS MANAGER

CROSS REFERENCE TO CO-PENDING APPLICATIONS

U.S. patent application Ser. No. 10/346,392, filed Jan. 17, 2003, and entitled, "Outboard Clustered Computer Systems Manager Utilizing Commodity Components"; U.S. patent application Ser. No. 10/346,458, filed Jan. 17, 2003, and entitled, "Ability to Support Non-Proprietary Locking Protocols"; U.S. patent application Ser. No. 10/346,301, filed Jan. 17, 2003, and entitled, "Support for Two-Phase Commit in Multi-Host Systems"; U.S. patent application Ser. No. 10/346,458, filed Jan. 17, 2003, and entitled, "Standard Channel I/O Processor (SCIOP)"; U.S. patent application Ser. No. 10/346,390, filed Jan. 17, 2003, and entitled, "A Method for Generating a Unique Identifier and Verifying a Software License in a Computer System Utilizing Separate Server for Redundancy"; U.S. patent application Ser. No. 10/346,696, filed Jan. 17, 2003, and entitled, "Software Control Using the Controller As a Component To Achieve Resiliency In a Computer System Utilizing Separate Servers For Redundancy"; U.S. patent application Ser. No. 10/346,489, filed Jan. 17, 2003, and entitled, "A Method for Allowing a Clustered Computer Systems Manger to Use Disparate Hardware on Each of the Separate Servers Utilized for Redundancy"; U.S. patent application Ser. No. 10/346,933 filed Jan. 17, 2003, and entitled, "A Clustered Computer System Utilizing Separate Servers for Redundancy in Which the Host Computers are Unaware of the Usage of Separate Servers"; U.S. patent application Ser. No. 10/347,009, filed Jan. 17, 2003, and entitled, "A Method For Shortening the Resynchronization Time Following Failure in a Computer System Utilizing Separate Servers for Redundancy"; U.S. patent application Ser. No. 10/346,411, filed Jan. 17, 2003, and entitled, "A Method for Distributing the Processing Among Multiple Synchronization Paths in a Computer System Utilizing Separate Servers for Redundancy"; and U.S. patent application Ser. No. 10/346,422, filed Jan. 17, 2003, and entitled, "A Method for a Controlled Fail-Over on a Clustered Computer Systems Manager Using Separate Servers for Redundancy" are commonly assigned co-pending applications incorporated herein by reference.

BACKGROUND OF THE INVENTION

1. Field of the Invention

The present invention generally relates to data processing systems and more particularly relates to data processing system architectures which are arranged in a cluster/lock processing configuration having efficient techniques to recover from system component failures involving the aging out of validity objects.

2. Description of the Prior Art

It is known in the prior art to increase the computational capacity of a data processing system through enhancements to an instruction processor. It is also known that enhancements to instruction processors become extremely costly to design and implement. Because such enhancements tend to render the resulting system special purpose in nature, the quantities of such enhanced processors needed within the market place is quite small, thus tending to further increase per unit costs.

An early approach to solving this problem was the "supercomputer" architecture of the 60's, 70's, and 80's. Using this technique, a single (or small number of) very large capacity instruction processor(s) is surrounded by a relatively large number of peripheral processors. The large capacity instruction processor is more fully utilized through the work of the peripheral processors which queue tasks and data and prepare needed output. In this way, the large capacity instruction processor does not waste its time doing the more mundane input/output and conversion tasks.

This approach was found to have numerous problems. Reliability tended to rest solely on the reliability of the large capacity instruction processor, because the peripheral processors could not provide efficient processing without it. On the other hand, at least some of the peripheral processors are needed to provide the large capacity instruction processor with its only input/output interfaces. The super computer approach is also very to costly, because performance rests on the ability to design and build the uniquely large capacity instruction processor.

An alternative to increasing computational capacity is the employment of a plurality of instruction processors into the same operational system. This approach has the advantage of generally increasing the number of instruction processors in the market place, thereby increasing utilization volumes. It is further advantageous that such an approach tends to utilize redundant components, so that greater reliability can be achieved through appropriate coupling of components.

However, it is extremely difficult to create architectures which employ a relatively large number of instruction processors. Typical problems involve: non-parallel problems which cannot be divided amongst multiple instruction processors; horrendous management problems which can actually slow throughput because of excessive contention for commonly used system resources; and system viability issues arising because of the large number of system components which can contribute to failures that may be propagated throughout the system. Thus, it can be seen that such a system can decrease system performance while simultaneously increasing system cost.

An effective solution is the technique known as the "cluster/lock processing system", such as the XPC (Extended Processing Complex) available from Unisys Corporation and described in U.S. Pat. No. 5,940,826, entitled "Dual XPCs for Disaster Recovery in Multi-Host Environments", which is incorporated herein by reference. This technique utilizes a relatively large number of instruction processors which are "clustered" about various shared resources. Tasking and management tends to be decentralized with the clustered processors having shared responsibilities. Maximal redundancy is utilized to enhance reliability.

Though a substantial advance, the cluster/lock systems tend to solve the reliability problems but remain relatively costly to implement, because virtually all of the hardware and firmware are specifically designed and manufactured for the cluster/lock architecture. This is necessary to enable each of the system components to effectively contribute to system reliability, system management, and system viability As a result, demand volumes remain relatively low. Furthermore, the logic necessary to provide efficient operation tends to be implemented within special purpose hardware and firmware, thereby further exacerbating the problems associated with low volume production. Operational times become highly important in real time and near real time applications even though there tends to be a substantial amount of data which must be processed to accomplish the cluster/lock operations.

SUMMARY OF THE INVENTION

The present invention overcomes the disadvantages of the prior art by providing a technique which provides efficient system operation within a cluster lock processing system. This is accomplished by increasing the validity operation throughput of the clustered systems manager, thereby increasing the performance of the systems being served by the clustered systems manager. Preferably, redundant cluster lock servers are operating in a "master/slave" relationship and are controlled by a readily available operating system, such as Windows. The failure recovery software is an application within each server which operates under that standard operating system. Therefore, the cluster/lock processing system is able to recover from the most significant of system failures (i.e., loss of a cluster lock server) without any need for specialized processing by host computers or users. By utilization of a particularly efficient recovery protocol, minimal system computational time is lost during the recovery process.

The preferred mode of the present invention is incorporated into a system with a relatively large number of low cost instruction processors providing an extremely high performance, high reliability, relatively low cost cluster/lock system. The low cost is largely achieved by utilizing "commodity" hardware and operating system software for the large numbers of instruction processors. In this sense, a "commodity" system component is one which is designed for and marketed to the general public. For example, in the preferred mode of the present invention, each of the large number of instruction processors is essentially an industry compatible personal computer chip available from Intel Corporation, similar to that found in many "high-end" home computers. Similarly, these instruction processors employ a commonly available operating system, such as a current version of "Windows" available from Microsoft Corporation.

As is well known, these commodity components, though relatively inexpensive because of the high production volumes, do not have the reliability features found in the more specialized hardware and software typically utilized for commercial, industrial, and defense applications. In fact, most home computer users are well aware of and simply learn to live with the reliability problems well known to exist in these commodity systems. Unlike previous cluster processing systems, the approach of the present invention does not incur the expense of upgrading these commodity components, but utilizes them as they exist in the market place.

Because the commodity components employed do not meet the desired levels of reliability, etc., virtually all system management, system reliability, and system viability responsibility is assigned to a centralized entity called the "cluster lock server". This server is not specifically developed for the present system, but already exists in the market place and is currently available to commercial and industrial users. In the preferred mode of practicing the present invention, the cluster lock server is a Cellular Multiprocessing (CMP) architecture System available from Unisys Corporation. The cluster lock servers are preferably employed in tandem for recovery from single point failures.

The cluster lock server hardware employs a set of software representatively called a "cluster lock manager" (CLM). This software is a component that communicates with each of the hosts and can assume the role of either master or slave. In the role of master, it receives and processes a host request for a database lock, read or write to cache, or inter-host message. It then informs any slave CLM of all memory updates resulting from the request and returns status to the requesting host. When in the role of slave, the CLM routes any request it receives directly from a host to the master CLM, accepts and performs all memory updates from the master CLM for each host request, and returns status to a host if the request was received directly by the slave CLM from a host.

As a result of the innovative architecture of the preferred mode of the present invention, extremely large processing capacity computer systems are clustered together using only off-the-shelf hardware and software with the addition of cluster lock manager software. Therefore, hardware and software costs are extremely low in view of the cluster lock processing system's processing capacity. These advantages accrue as a result of an architecture which employs cluster/lock processing, large scale caching, and direct mass storage accessing within a single platform. This provides reduced cost by eliminating the requirement to have two hardware platforms (i.e., one for data base locking/caching and one to perform I/O). A second advantage of the architecture is that it reduces needed connectivity. The number of connections required to support two separate platforms is eliminated. System overhead is further reduced because it is no longer needed to accelerate/decelerate cached I/O data to provide an interface between two different platforms.

The primary capability for recovery from system component failures resides in the redundant cluster lock servers. In the prior art systems, this functionality was provided in proprietary hardware and firmware. In accordance with the present invention, multiple redundant cluster lock servers, each operating under a commonly available operating system such as Windows, have software applications which implement the logic required for system recovery from component failures. The multiple redundant cluster lock servers are arranged through control of the redundancy recovery software such that only one is serving in the master role at any one time. The failure of this master platform must result in a switch over of functionality to a redundant server previously functioning in a slave role. Thus, the system must ensure that precisely one cluster lock server is always serving in the master role.

The cluster/lock functionality as required by each host is provided by the cluster/lock service program that is running on the platform currently serving as master. The locking, caching, and inter-host messaging requests originating from each host are indiscriminately directed to either the master or slave platforms. This is because the hosts view the master and slave platforms as a single transaction cluster/lock processor. With no awareness by the host software, requests received by the slave platform are routed by the service program running in the slave mode through a crossover path to the master platform.

The service running on the master grants the requested lock, performs the read or write to cache, or routes the requested inter-host message. The master then sends the memory updates required by the operation to the slave and reports the status for the request back to the requesting host. In this manner, the slave platform has all the information necessary to assume the role of master, should a failure occur, with retention of all the locks, cached data, and pending messages as requested by the hosts.

The master and slave platforms, as well as the hosts, can be placed at different geographical sites in order to provide protection from a site disaster. When the cluster/lock service program running on the slave can no longer communicate with its counterpart on the master, it cannot simply assume that the master platform has failed and take on the role of master. The loss of response from the master platform could, in fact be caused by the loss of all of the interfaces between the master and slave and between the hosts rather than by the total loss of the site on which it resides. The master could still be operating properly and servicing requests from hosts that have a direct connection to it. The slave cannot begin to service requests from its directly connected hosts without the intervention of a "third party" (i.e., XPC control) that can ensure that only one platform is serving as master. It is imperative that only one platform assume the role of master at any given time. This is so, because locking and caching operations, due to their very nature, must be provided by a single source to ensure data integrity.

The XPC Control program communicates with each (master and slave) XPC service program and with any redundant XPC Control PC through a local area network (LAN) that can also be made redundant. In order to ensure that there is only one master, the XPC service program can be started only by XPC Control through a service request and the XPC service program waits to receive its role as master or slave from the XPC Control program. Most importantly, an XPC service program running in slave mode will not assume the role of master without confirming via XPC Control that it can assume the role of master. Because XPC Control communicates with both master and slave through LAN interfaces that are independent of any other interface used by the XPC platforms, it can verify that the previous master platform is no longer in operations. XPC utilizes 'validity objects' to aid the host systems management of memory caches. Host system throughput may be limited by the number of validity operations per record that may be performed by the cluster lock processing system.

The present invention enhances operational efficiency by utilizing a validity object aging mechanism that removes "aged out" validity objects in a manner that increases the number of validity operations per second. The approach adds a "most recent age" specification to the "owner entry" and an "age specification" to each validity entry, which are used to determine whether a validity object has "aged out". The most recent age specification is incremented each time a new validity entry is created for an owner.

For example, an owner entry defines an owner size of 4 and a most recent age of 67, yielding an owner validity list with ages of 64, 65, 66, and 67. A new validity operation is requested, causing a new validity entry to be added to the owner/object lists. The owner entry now contains a most recent age of 68 and the owner/object lists contains validity entries with ages 64, 65, 66, 67, and 68. The validity entry with age 64 has now aged out, but is not removed from the lists during the execution of the command that created validity entry 68. A background operation later finds that validity entry 64 has aged out and removes it from the owner/object lists.

The technique eliminates the previously required delink/relink operations that occurred when the least recently used validity object was reused, as well as eliminates the use of one exclusive lock while performing the validity operation.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention is described in accordance with several preferred embodiments which are to be viewed as illustrative without being limiting. These preferred embodiments are based upon mainframe hardware components and various operating system software components available from Unisys Corporation and commodity hardware and software components available from Microsoft Corporation, Intel Corporation, and in the general personal computer market place.

Figure 1:
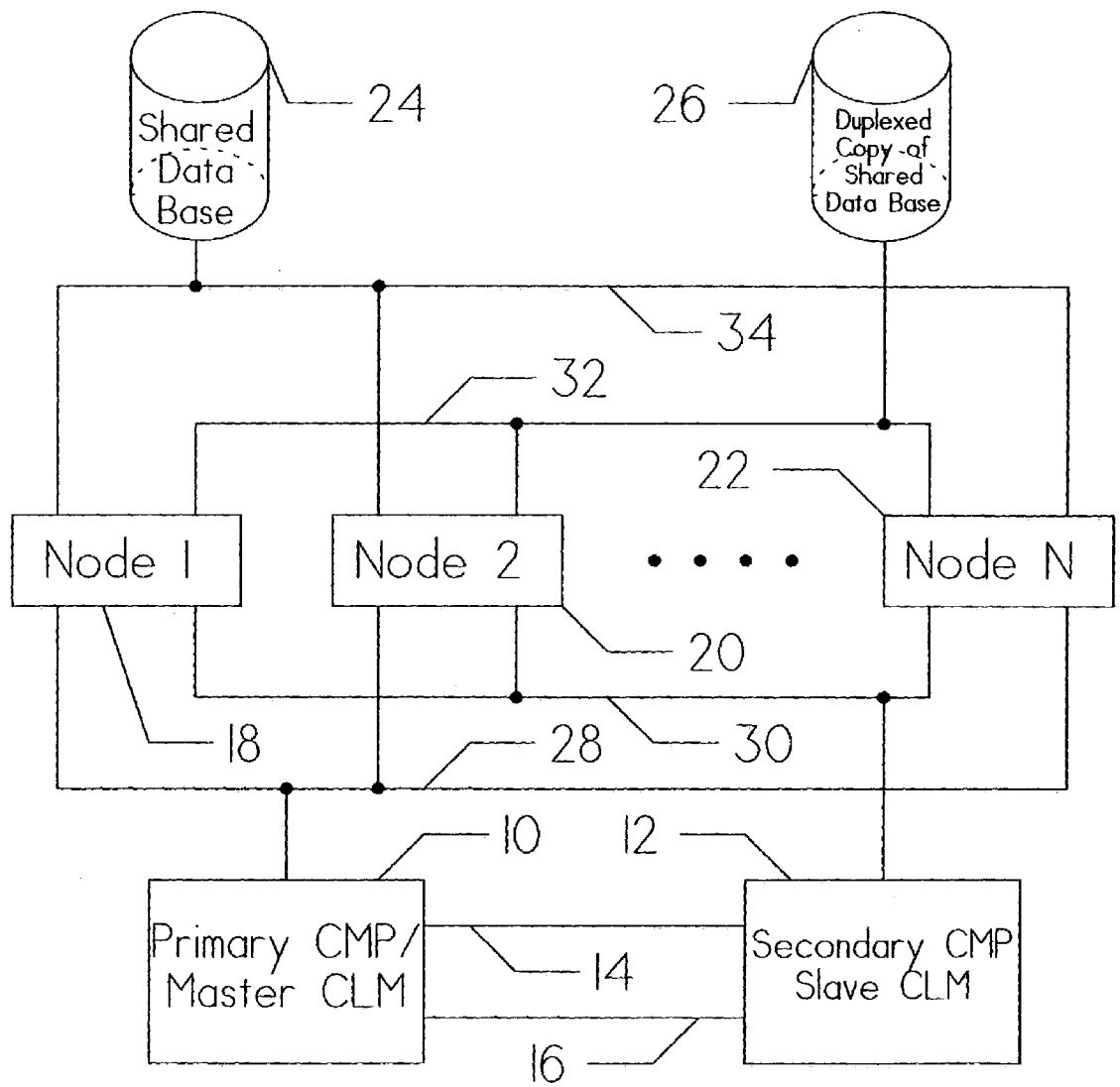
FIG. 1 is detailed block diagram showing a generalized clustered computer system in accordance with the present invention.

FIG. 1 is a detailed diagram showing the general relationship of the major components that comprise a clustered computer system. The host systems are represented by Node 1 (18), Node 2 (20), and Node N (22). The total number of host systems is selected for the particular system application(s). Each of these instruction processors communicate with Data Base 24 and Duplex Copy 26 of Data Base 24 via busses 34 and 32, respectively. This provides the redundancy necessary to recover from single point of failures within the data base.

In addition to the interface with the data base and its duplicate copy, the host systems can communicate only with Primary CLS (Cluster Lock Server) 10 and Secondary CLS 12 via busses 28 and 30, respectively. Redundant connections to redundant cluster lock servers ensures that single point control structure failures can also be accommodated. Because the sole interface between the host systems (i.e., Nodes 1, 2, . . . N) is with the Primary CLS and Secondary CLS, all services to be provided to an individual host system must be provided by the Primary CLS or Secondary CLS. The primary services provided include: 1) services to synchronize updates to one or more shared databases; 2) services to facilitate inter-node communication; 3) services to provide for shared data among the nodes; 4) services to detect failing nodes in the cluster; and 5) duplication of all information contained in the Primary Cluster Lock Server.

Services provided for synchronization of database updates assume all nodes in the cluster use the same locking protocol. The Cluster Lock Manager (CLM) is the "keeper" of all locks for shared data. The locking functionality includes: 1) ability for any node to request and release database locks; 2) ability to support multiple locking protocols; 3) asynchronous notification to the appropriate node when a lock has been granted; 4) automatic deadlock detection including the ability to asynchronously notify the nodes owning the locks that are deadlocked; and 5) support for two-phase commit processing including holding locks in the "ready" state across recoveries of individual nodes.

Inter-node communication services provide the capability for any node to send messages to and receive messages from any other node in the cluster. The ability for a node to broadcast to all other nodes is also provided.

Shared data services provide the capability for the nodes to share the common data structures required to facilitate the management and coordination of the shared processing environment. This data is maintained within the CLM.

Failed node detection services include heartbeat capability, the ability to move in-progress transactions from a failed node onto other nodes and the ability to isolate the failed node.

Although not required to practice the invention, in the preferred mode, the cluster lock processing system is composed of a primary/secondary cluster lock server and a master/slave cluster lock manager. The nodes communicate with either the Master or the slave with the master ensuring all data is duplicated in the slave. The ability of a node to communicate with either the master or the slave at any time increases resiliency and availability as the loss of the physical connection from the node to either the master or the slave does not effect the nodes's ability to continue operating. The master is responsible for control and heartbeat functions. The ability to manually switch from the master to the slave is also provided in the preferred mode. Manual switching facilitates testing and maintenance. Of course, automatic switching occurs upon failure of the master CLM.

Figure 2:
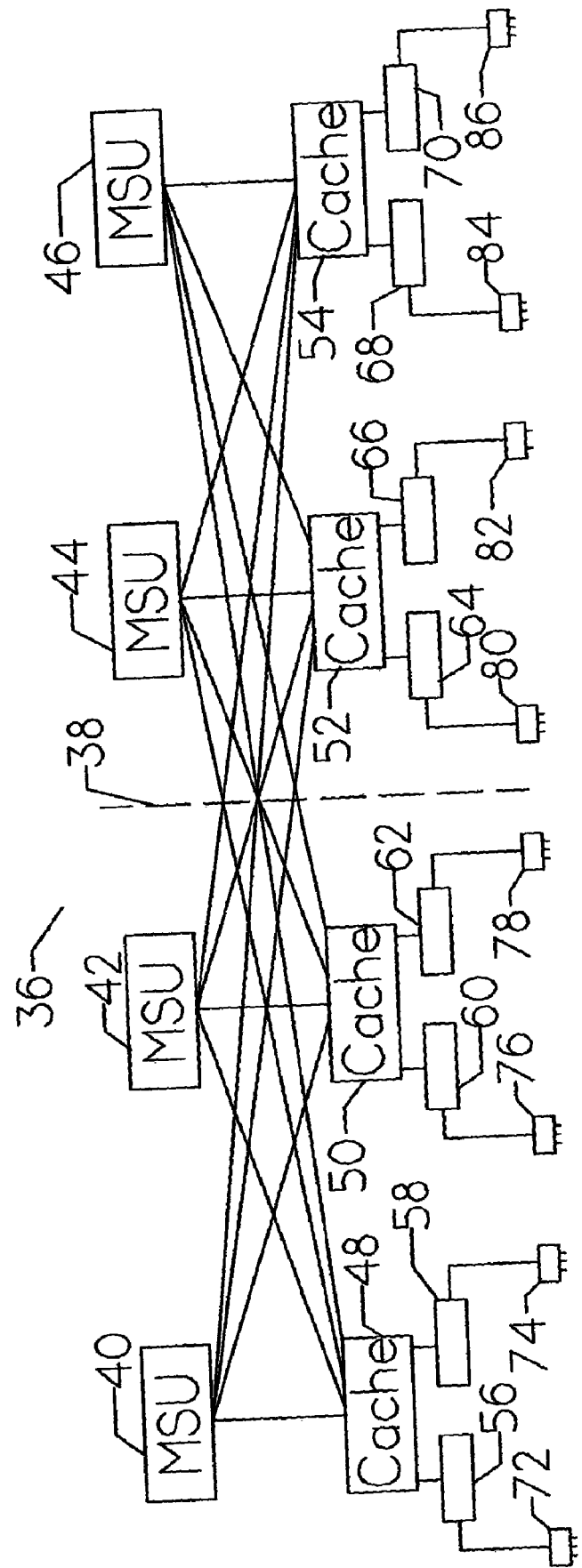
FIG. 2 is a detailed diagram showing the architecture of the cluster lock server.

FIG. 2 is a detailed block diagram 36 of a fully populated ES7000 Cellular Multi-Processor (CMP) system available from Unisys Corporation. Each of Primary CLS 10 (see FIG. 1) and Secondary CLS 12 (see FIG. 1) consists of one of these computers. The ES7000 CMP is a commercially available product available from Unisys Corporation now on the market. One key advantage of this computer is that it makes the cluster lock server inherently scalable. It should be readily apparent that the total processing load on a cluster lock server increases directly with the number of clustered instruction processors which are directly managed by that cluster lock server. Thus, it is of substantial value that a readily scalable processor is utilized for this purpose. It is further assumed that the cluster lock server has the inherent reliability (e.g., failure recovery) and system viability (e.g., memory and shared resource protection) functionality to assume responsibility for these aspects of the system's operation.

A fully populated CMP contains up to four main memory storage units, MSU 40, MSU 42, MSU 44, and MSU 46. These are interfaced as shown through up to four cache memory systems, Cache 48, Cache 50, Cache 52, and Cache 54. Each of subpods 56, 58, 60, 62, 64, 66, 68, and 70 contains up to four instruction processors, each having its own dedicated cache memories. Duplexed input/output processors 72, 74, 76, 78, 80, 82, 84, and 86 interface with the commodity instruction processors (see FIG. 1), with other cluster lock server(s), and with host computers (see below). Thus, each of the cluster lock servers (i.e., Primary CLS 10 and Secondary CLS 12, see FIG. 1) preferably consists of an ES7000 CMP having from one to four MSU's, one to four Cache's, one to eight subpods, and one to eight duplexed input/output processors.

To further enhance reliability, and already a part of the ES7000 CMP system, various of the components are separately powered. In accordance with the fully populated system of block diagram 36, all components left of line 38 are powered by a first power source (not to shown) and all components right of line 38 are powered by a second power source (not shown). In this manner, the system remains viable even during the course of a single power source failure.

Figure 3:
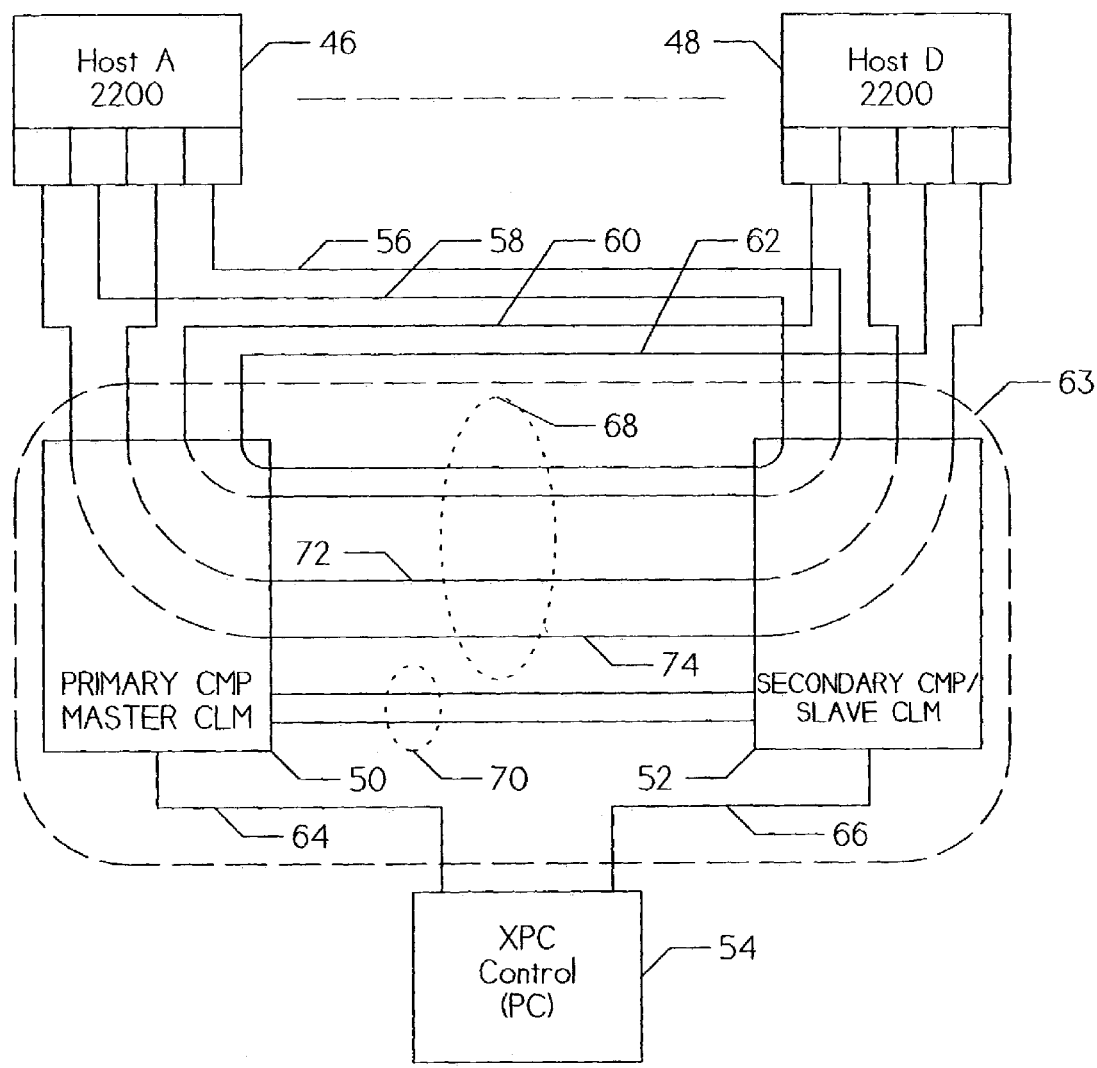
FIG. 3 is a detailed schematic diagram showing data flow paths within the overall system of the present invention.

FIG. 3 is a detailed block diagram showing implementation of the cluster processing system (XPC) 63 of the present invention within a practical configuration for high capacity and high reliability data processing. The major components include Primary CMP/Master CLM 50 and Secondary CMP/Slave 52 and connection 68,70 between them. The actual clustered instruction processors (i.e., Nodes 1-N) are not separately shown except through their interface with the XPC. XPC control 54 is a personal computer implemented as control console which interfaces with the XPC via intercomputer paths 64 and 66.

The "external world" is shown as Host A 46 through Host D 48, which are coupled to the XPC via intercomputer paths 56, 58, 60, and 62. The host computers are preferably Clearpath Plus (2200 based) mainframe computers available from Unisys Corporation. The paths are arranged to provide completely redundant paths amongst all major components. Paths 68 are the Primary/Secondary crossover paths wherein paths 72 and 74 are redundant request/status packet routing paths. Paths 70 are the Primary/Secondary synchronization paths.

A typical exchange between the host computers 46 and 48 and the XPC 63 further helps to illustrate the overall system operation. The Host D 48 issues a request via intercomputer path 60. The Master CLM 50 processes the request and generates an SRR packet 84 (see FIG. 5) containing audit data that is routed to the Slave CLM 52 via one of the Synchronization Paths 70. The Slave CLM 52 receives the SRR packet 84 via one of the Synchronization Paths 70, performs the data updates defined in the SRR packet 84 and sends an SRR packet 84 containing 'audit updates completed' on the same Synchronization Path. The Master CLM 50 receives the SRR packet 84 containing the 'audit updates completed' and completes the request by sending a status packet to Host D 48 via intercomputer path 60.

Figure 4:
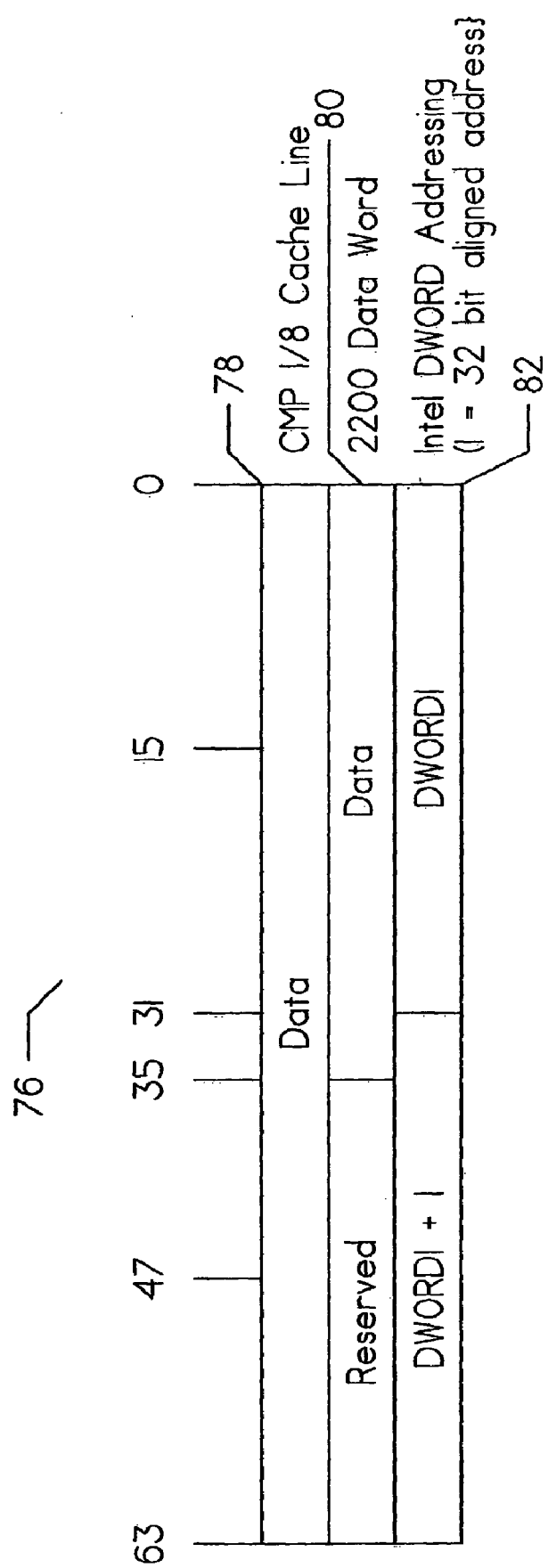
FIG. 4 is a diagram showing the format of data transfers between the commodity processors and the host computers.

FIG. 4 is a detailed diagram 76 showing the format for data conversion between the XPC 63 with Host A through Host D. Host A through Host D, being ClearPath Plus (OS 2200 based) mainframes from. Unisys Corporation, have a basic 36 bit word internal format, whereas the XPC is basically byte oriented with 16 bit, 32 bit, and 64 bit words. A 64 bit data word 78 corresponds to a 36 bit 2200 data word 80, and two 32 bit Intel DWORD's 82.

Figure 5:
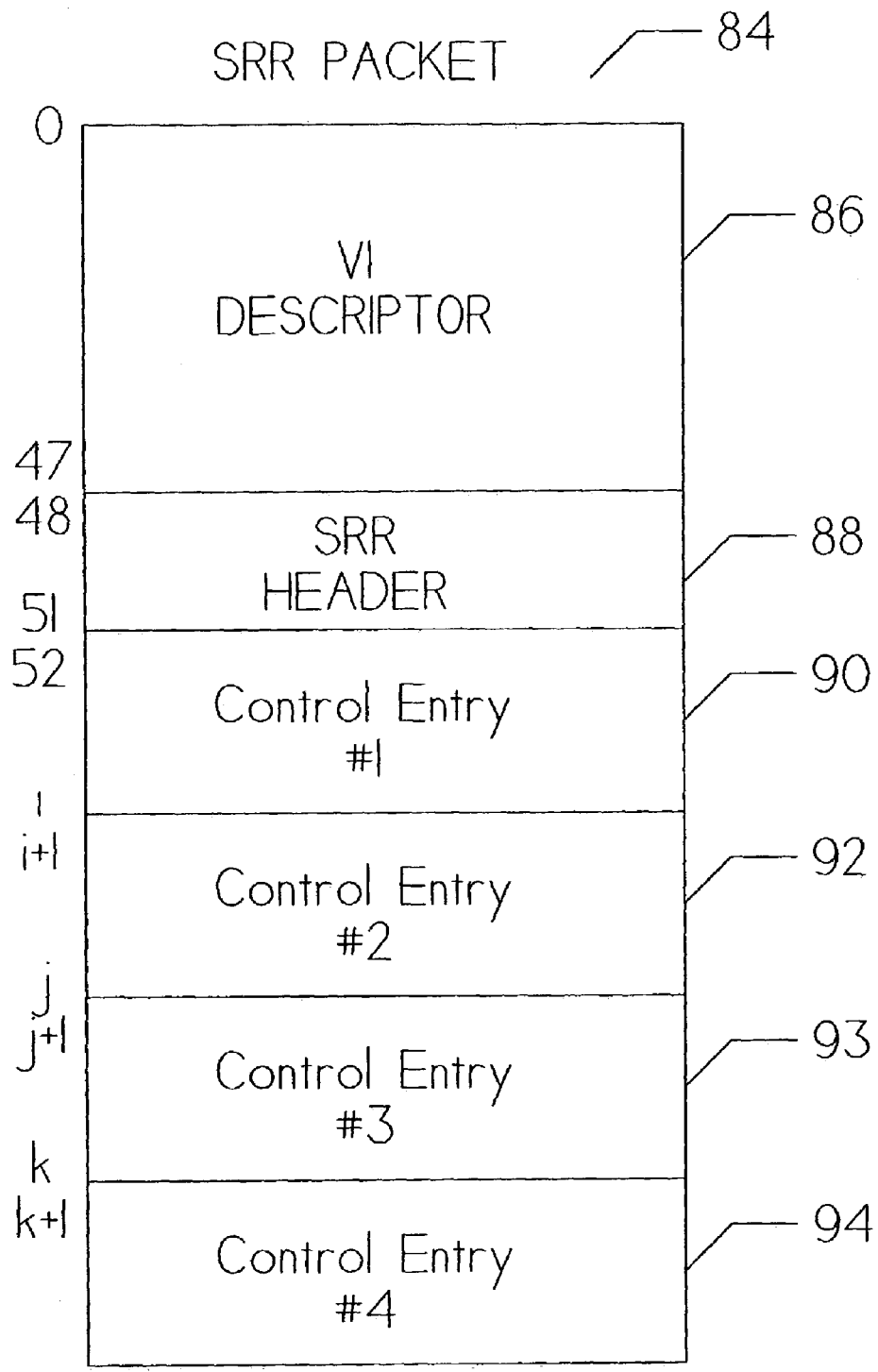
FIG. 5 shows the format of the Synchronization path Request/Response (SRR) packet.

FIG. 5 is a diagram 84 showing the format of a Synchronization path Request/Response (SRR) packet. Though the SRR packets are primarily used to convey audit data from master to slave, they are also used to implement the master/slave control functions. The first 48 words contain Descriptor 86. This is followed by Header 88. A number of control entries (i.e., Control Entry #1 90, Control Entry #2 92, Control Entry #3 93, and Control Entry #4 94) provide the actual control information. Each of the control entries has a variable length depending upon the function to be performed, as explained below.

Figure 6:
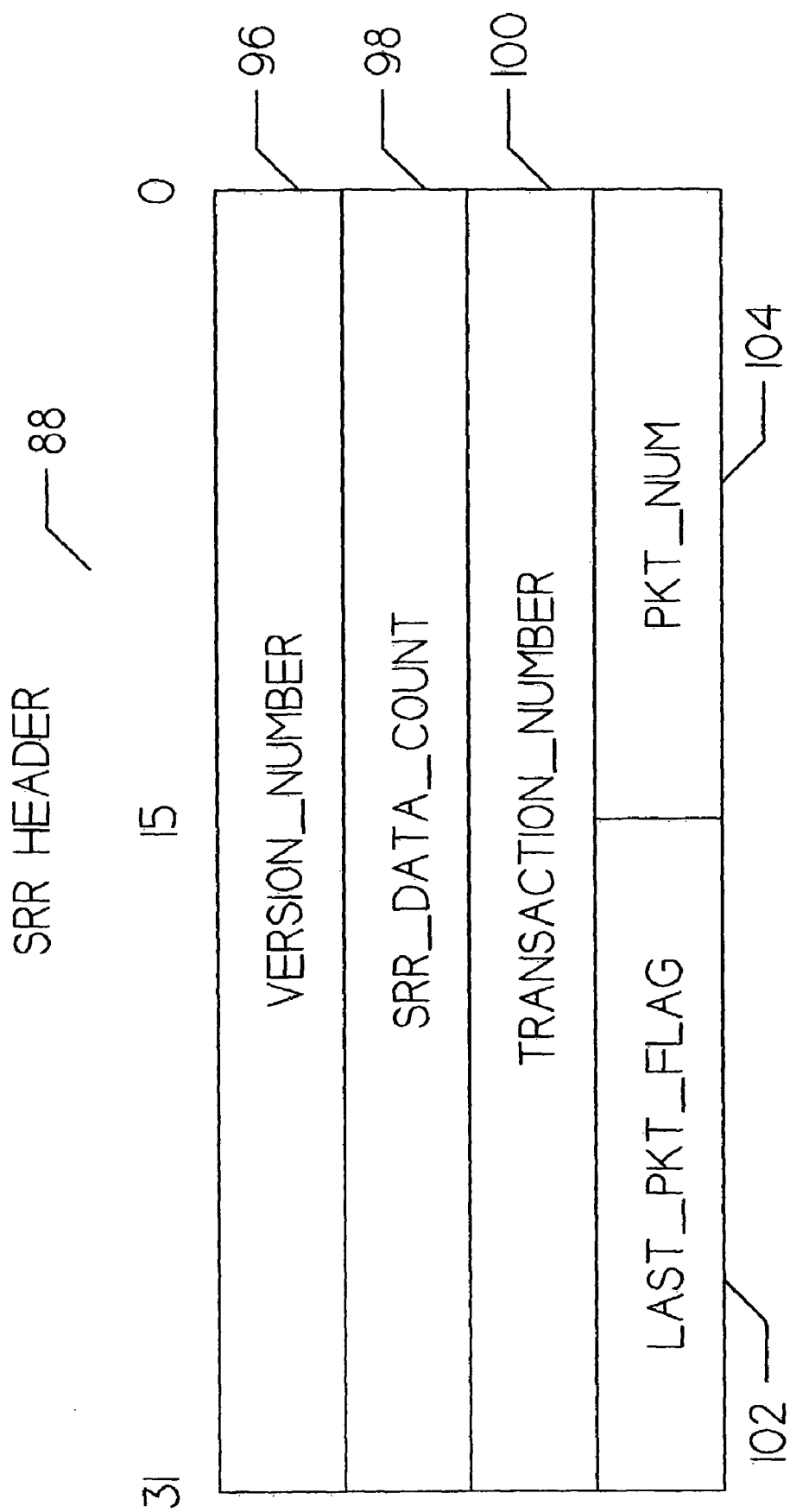
FIG. 6 is diagram showing the format of the SRR packet header.

FIG. 6 is a diagram showing the format of SRR header 88. The first 32 bit word contains version number 96, which describes the version number of the service running on the platform. This is used to determine whether services running on primary/secondary platforms are compatible.

This is followed by SRR data count 98, indicating the number of 32 bit words within the SRR packet, and transaction number 100. The last 32 bit word of the fixed length SRR header 88 contains Last Packet Flag 102, which indicates that the current packet is the last packet of an audit sequence and Packet Number 104. If Last Packet Flag 102 is set and Packet Number 104 is equal to 1, the current SRR packet is the only packet in the audit sequence.

Figure 7:
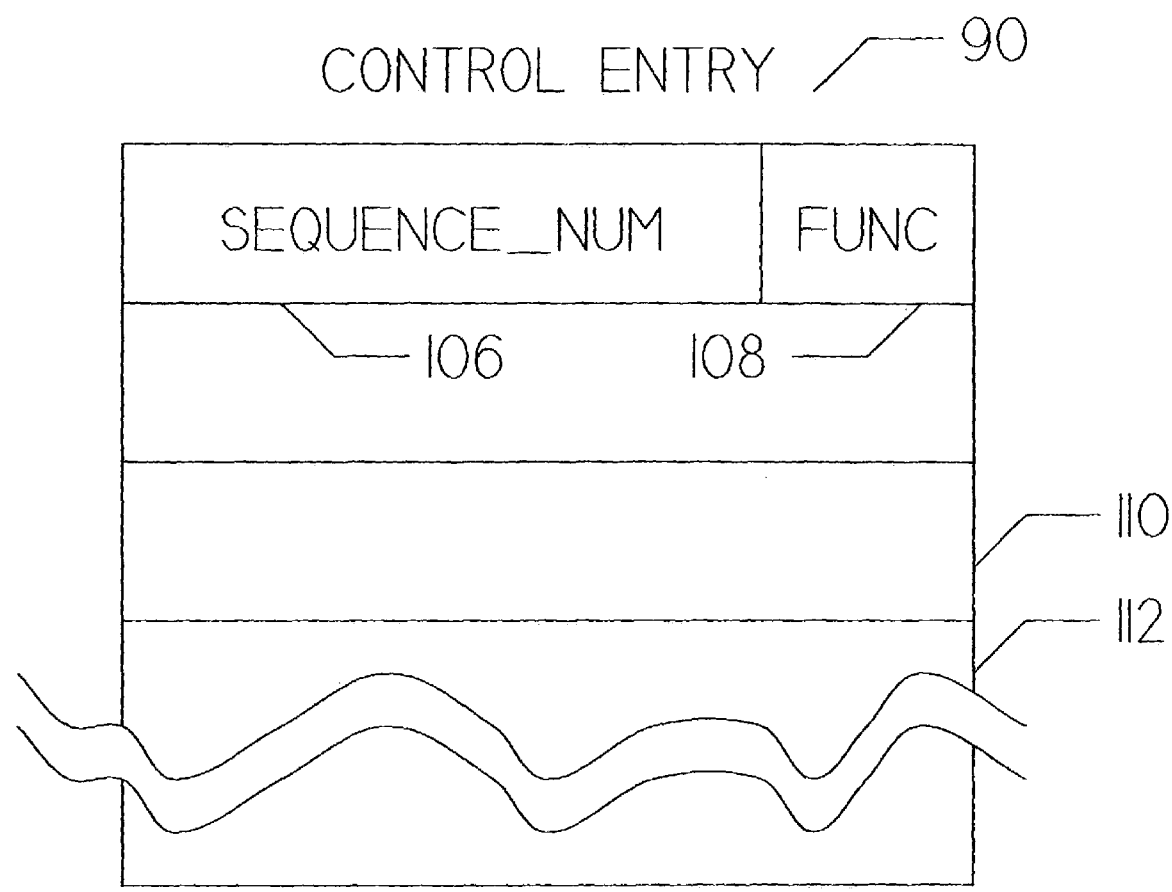
FIG. 7 is a diagram showing the format of a control entry.

FIG. 7 is a diagram showing the format of control entry 90. Sequence Number 106 is available to keep track of the specific control entry. Function 108 determines the length of the control entry, because it determines the number of 32 bit words 110-112 required to define the function.

The function code is an 8 bit number which decodes into 256 different numbers. Values 0, 7-16, and 33-255 are defined as invalid. The remaining defined function codes are as follows:

1—Write Audit Data;
2.—Audit Updates Completed;
3.—Resend Audit Data;
4.—Abort Audit Updates;
5.—Audit Request Accepted;
6—Audit Request Rejected;
17—Heartbeat;
18—Probe Path Identification;
19—Path Identification;
20—Query Memory Size;
21—Return Memory Size;
22—Set Memory Size;
23—Transfer Coherent Memory;
24—Coherent Memory Transfer Completed;
25—Up/Down Path;
26—Switch State Pending;
27—Switch Master/Slave State;
28—Commit State Change;
29—Request permission to become active;
30—Terminate Service Request;
31—Positive Acknowledge; and
32—Negative Acknowledge.

Figure 8:
FIG. 8 is a memory allocation table for the cluster lock processing system.

FIG. 8 is a table showing structures that are allocated in memory as made by the) XPC.

Figure 9:
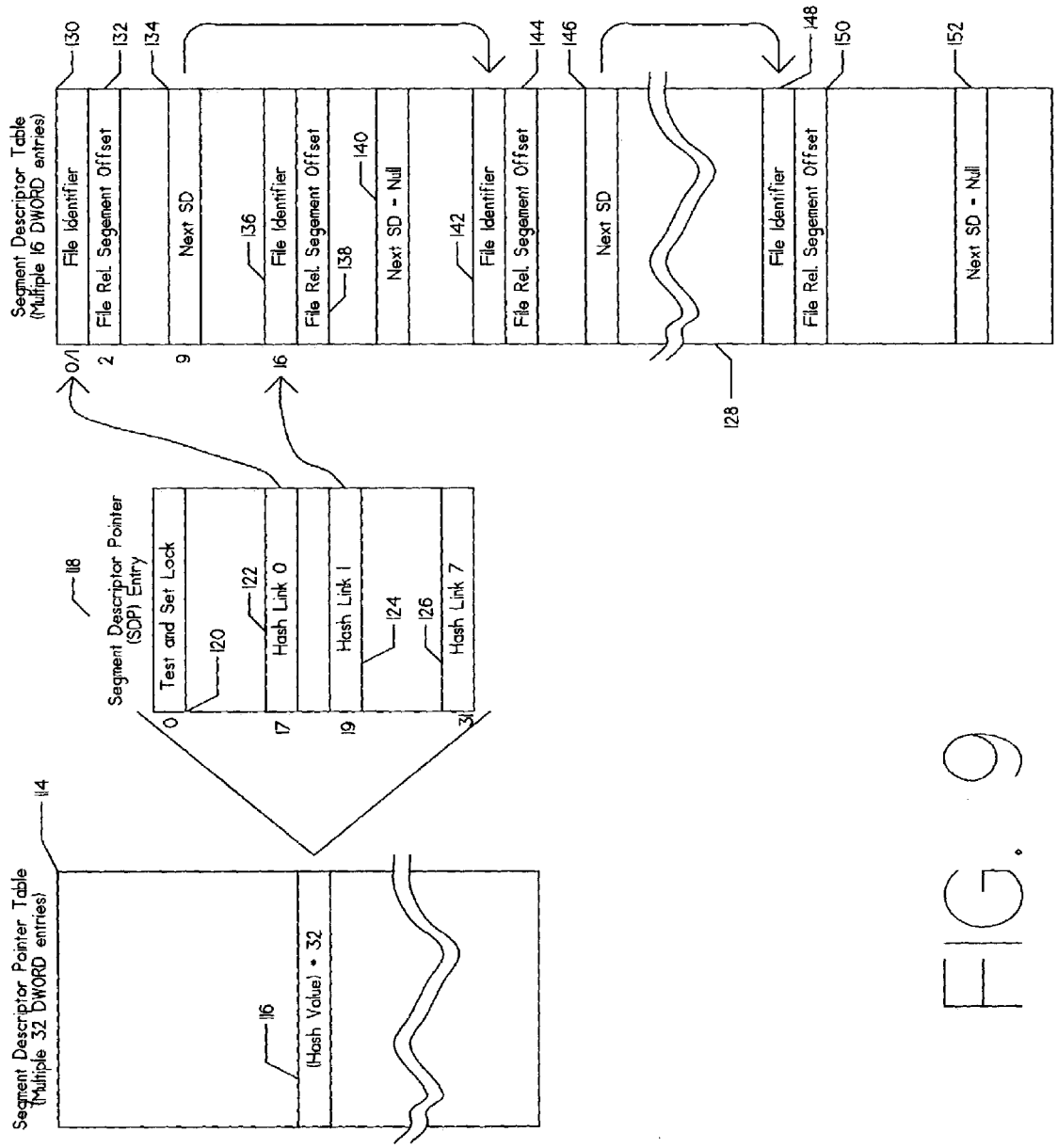
FIG. 9 is a detailed diagram showing operation of the segment descriptors.

FIG. 9 is a detailed diagram showing segment descriptor accessing. Segment Descriptor Pointer Table 114 consists of multiple 32-bit unsigned integer entries. Example 116 is an entry having hash value=32 which points to Segment Descriptor Pointer (SCP) Entry 118.

Segment Descriptor Pointer Entry 118 consists of 32 words of 32 bits each. The first word is the test and set lock which is used to control access to the segment descriptors that hash to this entry. The remaining words point to up to eight entries within the Segment Descriptor Table, consisting of multiple 32-bit unsigned integers. Word 17 of Segment Descriptor Pointer Entry 116 is hash link 0 (122), word 19 is hash link 1 (124), and word 31 is hash link 7 (126).

The file name associated with hash link 0 is File Identifier 130 occupying the first two words of the Segment Descriptor Table. The corresponding File Relative Segment Offset 132 is located in the next word. Word 9 is Next Segment Descriptor 134 which points to the next associated segment (i.e., File Identifier 142) as shown.

Similarly, the file name associated with hash link 1 (124) is File Identifier 136. File Relative Segment Offset 138 provides the corresponding relative offset. Because there are no further associated segment descriptors, Next Segment Descriptor 140 is null.

File Relative Segment Offset 144 corresponds to File Identifier 142. Associated therewith is Next Segment Descriptor 146 which points to File Identifier 148, located subsequent to extended area 128. File Relative Segment Offset 150 corresponds thereto. There are no further associated segment descriptors so Next Segment Descriptor 152 is null.

Figure 10:
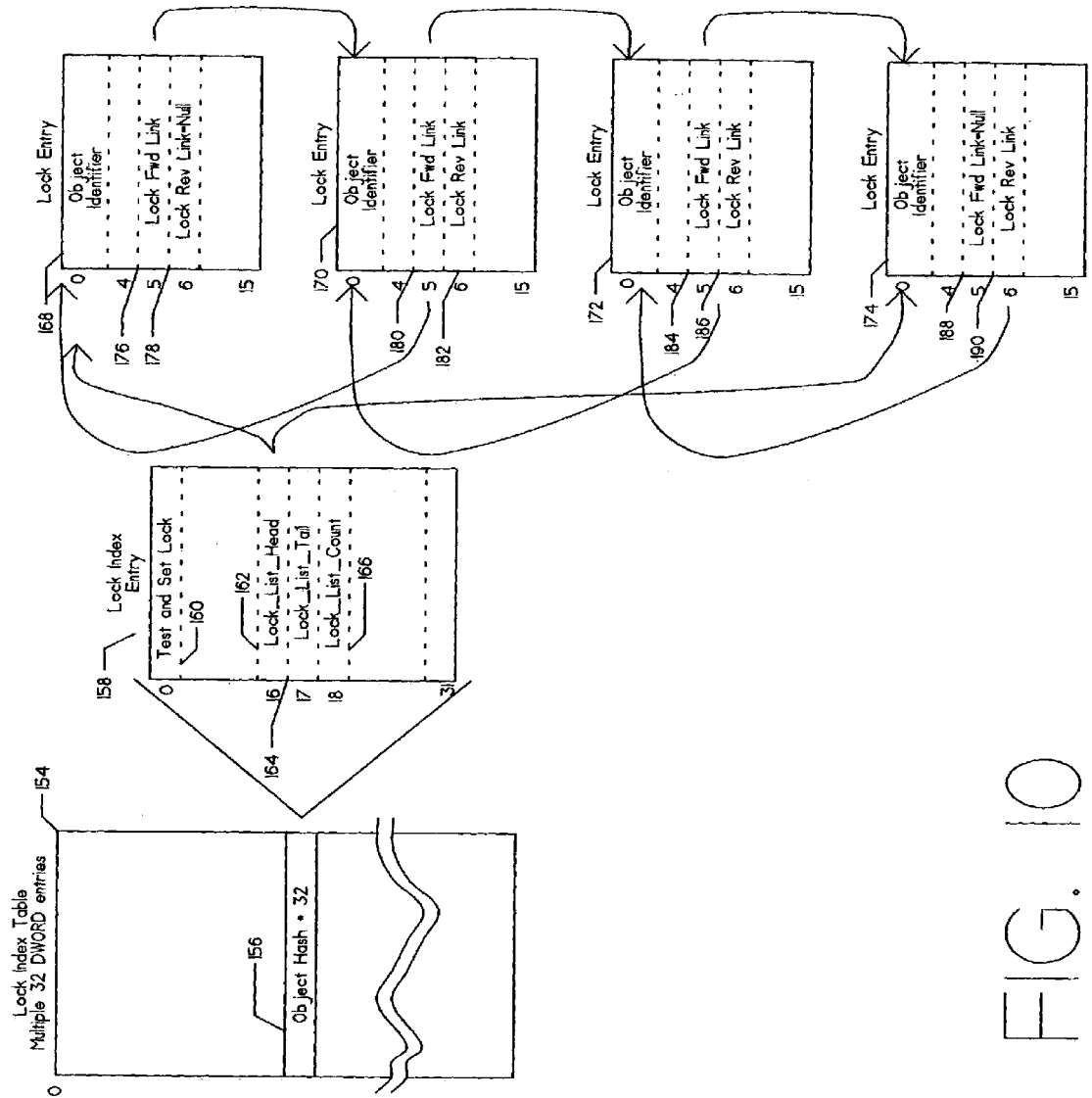
FIG. 10 is a detailed diagram showing operation of the locks.

FIG. 10 is a detailed diagram showing lock entry accessing. It is via this locking system that the XPC (see also FIG. 1) maintains control of the shared database facilities. Lock Index Table consists of multiple 32-bit unsigned integer entries. Example 156 is Object Hast*32 which points to Lock Index Entry 158.

Test and Set Lock 160 occupies the first word of Lock Index Entry 158. It is used to control access to this lock list. Lock_List_Head 162 provides the address of the first lock entry that hashes to this location. Lock_List_Tail 164 supplies the address of the last lock entry that hashes to his location. Lock_List_Count 166 specifies the number of lock entries on this lock list.

Object Identifier 168, 170, 172, and 174, name the actual lock entries for this particular lock list. Lock Forward Links 176, 180, 184, and 188 address the next lock entry in this lock list. Lock Reverse Links 178, 182, 186, and 190 supply the address of the previous lock entry in this lock list. Because it is associated with the first lock entry in the lock list, Lock Reverse Link 178 is Null.

Figure 11:
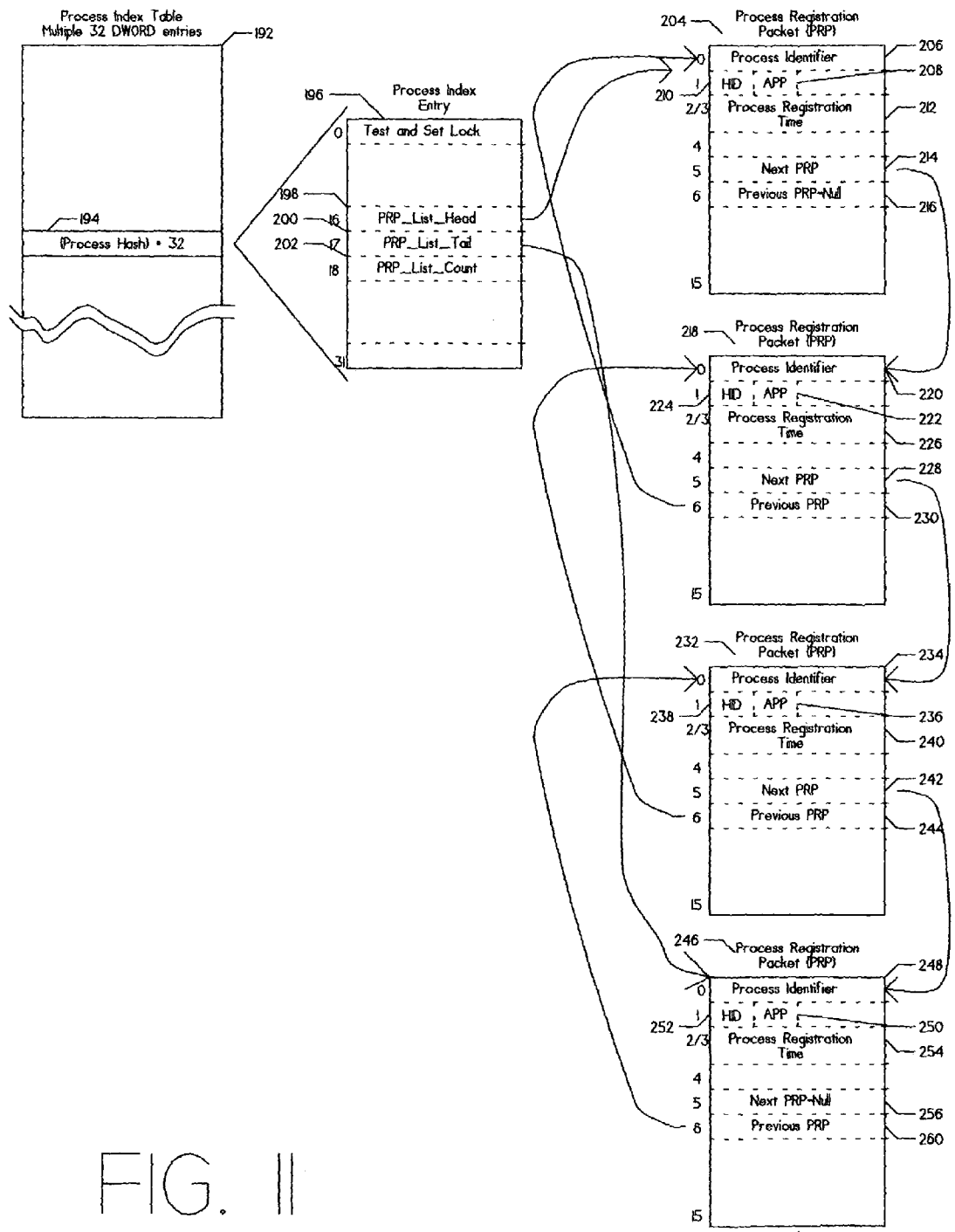
FIG. 11 is a detailed diagram showing operation of processes.

FIG. 11 is a detailed diagram of Process Entry accessing in accordance with the preferred mode of the present invention. Process Index Table 192 consists of multiple 32-bit unsigned integer entries. Sample entry 194 contains process hash*32 which identifies the Process Index Entry shown.

Test and Set Lock 196 is used to control access to this process list. PRP_List_Head 198 addresses the first Process Registration Packet 204 that hashes to this location. PRP_List_Tail 200 supplies the address of the last Process Registration Packet 246 that hashes to this location. PRP_List_Count 202 provides the number of Process Registration Packets on this process list.

Process Registration Packets (PRP) 204, 218, 232, and 246, each consist of 16-32-bit unsigned integers. The first word is Process Identifier 206, 220, 234, and 248, respectively. The second word contains Host Identifier 210, 224, 238, and 252 and Application Identifier 208, 222, 236, and 250, each of which define processing for the corresponding clustered instruction processor.

Process Registration time 212, 226, 240, and 254 is maintained in each of the Process Registration Packets. Part of the time is derived from the Windows operating system time and part from a code-maintained counter, which is sized to assure overall registration time uniqueness.

Next PRP 214, 228, 242, and 256 point to the next Process Registration Packet within the list. Because PRP Packet 246 is the last packet in a list, next PRP is set to null. Similarly, Previous PRP 216, 230, 244, and 260 each point to the next previous PRP packet. Because PRP Packet 204 is the first packet in the list, Previous PRP is set to null.

Figure 12:
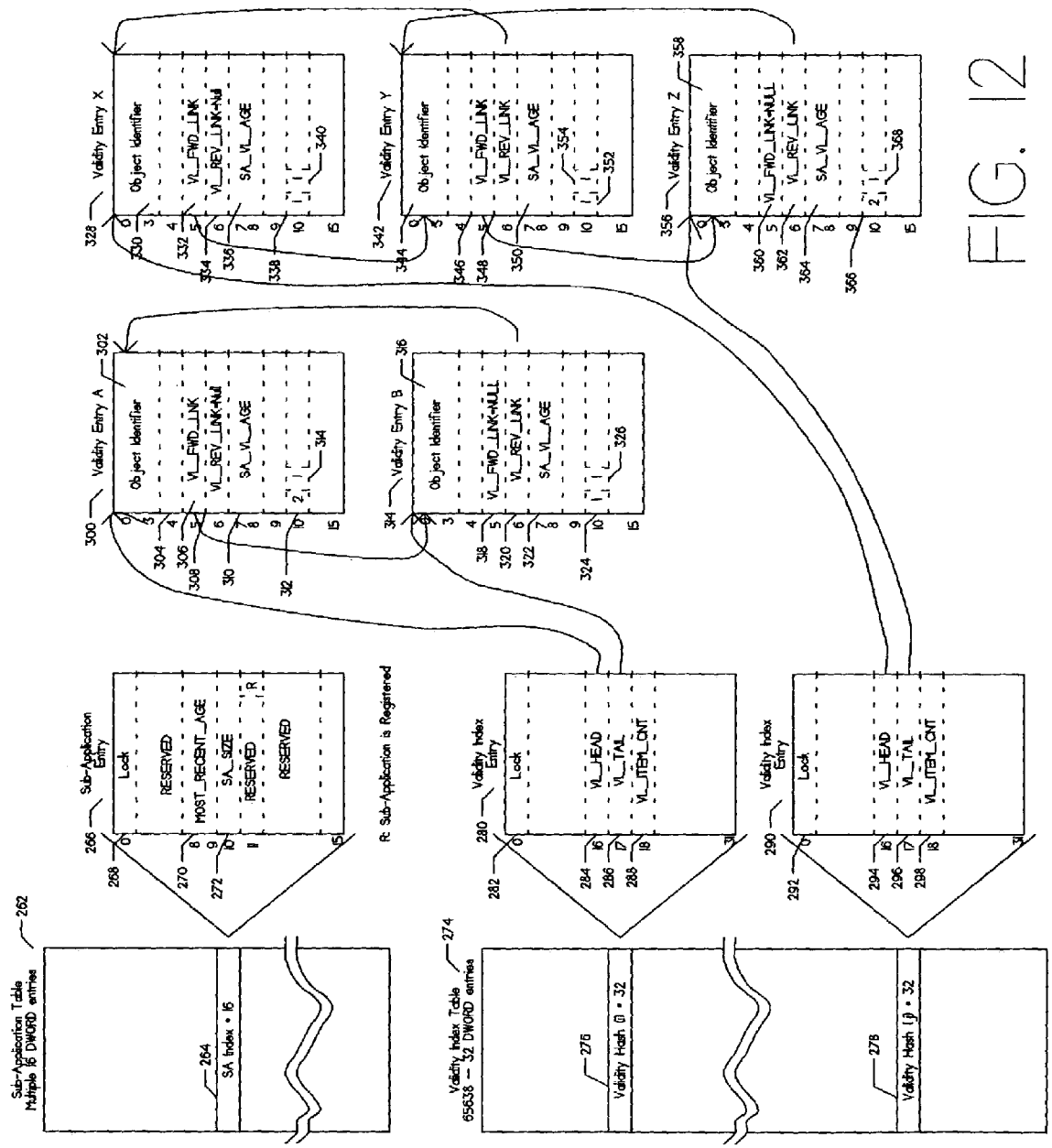
FIG. 12 is a detailed diagram showing operation of sub-applications and validity entries.

FIG. 12 is a detailed view of the Inter-Host Cache (IHC) data structures. Two validity lists are shown in the example, with validity entries for sub-applications 1:1 and 2:1. The sub-application entry is shown for sub-application 1:1, and contains the Most_Recent_Age of validity entries for sub-application 1:1. The Most_Recent_Age is used in conjunction with the sub-application size (SA_SIZE) to implement a MRU/LRU algorithm used to determine if the validity object is within the sub-application cache. Validity list entries which are outside of the LRU limit are removed whenever a validity operation encounters an 'old' entry. This is accomplished via a scan of the entire validity list after status is returned to the host.

In the example, validity list T contains two entries (A and B), one each for sub-application 1:1 and 2:1. Validity list 'j' contains three entries (X, Y and Z), two for sub-application 1:1 and one for sub-application 2:1. The sub-application entry is shown for sub-application 1:1, having a Most_Recent_Age of 683 and SA_Size of 100, yielding a "validity age' range of 584-683. The validity entries in validity list T (entries X and Y) are both within the range and are therefore within the sub-application cache. However, the validity entry B in validity list T for sub-application 1:1 is not within the range, and is therefore not within the sub-application cache. The next IHC operation that references validity list T will find and remove the 'aged out' entry.

Sub-Application Table 262 contains multiple 32-bit unsigned integer entries. Entry 254 contains a Sub-Application Index*16 which points to Sub-Application Entry 266. The first word is Test and Set Lock 268 which controls access to the sub-application entry. MOST_RECENT_AGE 270 is the counter value for the most recently accessed validity entry in this sub-application. After its initial value of zero, the only operations allowed on this field are increments. SA_SIZE 272 is the number of validity entries for this sub-application. This is the value as seen by the hosts and not the actual number of validity entries that are on the validity lists.

Validity Index Table 274 contains multiple 32-bit unsigned integer entries. A first sample entry 276 contains Validity Hash (i*32) which points to Validity Index Entry 280. A second sample entry 278 contains Validity Hash (j*32) which points to Validity Index Entry 290.

Validity Index Entry 280 has a Test and Set Lock 282 which is used to control access to this validity list. VL_HEAD 284 supplies the address of the first validity entry (i.e., Validity Entry A 300) that hashes to his location. Similarly, VL_TAIL 286 contains the address of the last validity entry (i.e., Validity Entry B 314) that hashes to this location. VL_ITEM_CNT 288 specifies the number of validity entries on this validity list.

Validity Index Entry 290 has a Test and Set Lock 292 which is used to control access to this validity list. VL_HEAD 294 supplies the address of the first validity entry (i.e., Validity Entry X 328) that hashes to his location. Similarly, VL_TAIL 296 contains the address of the last validity entry (i.e., Validity Entry Z 356) that hashes to this location. VL_ITEM_CNT 298 specifies the number of validity entries on this validity list.

Each of Validity Entries A 300, B 314, X 328, Y 342, and Z 356 contains an Object Identifier (i.e., 302, 316, 330, 344, and 358); a forward link (i.e., VL_FWD_LINK 306, 318, 332, 346, and 360); a reverse link (i.e., VL_REV_LINK 308, 320, 334, 348, and 362); and an age (i.e., SA_VL_AGE 310, 322, 336, 350, and 364).

Figure 13:
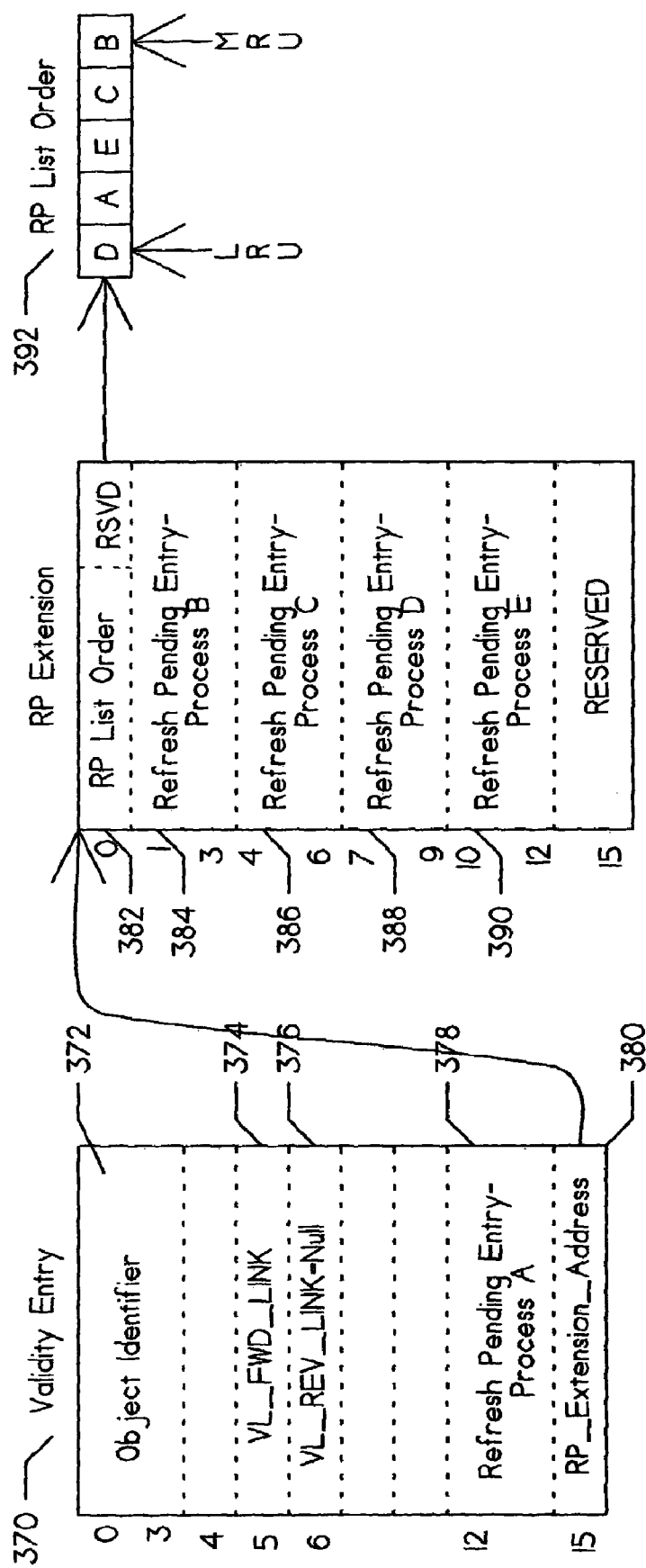
FIG. 13 is a detailed diagram showing operation of the refresh pending entries.

FIG. 13 is detailed diagram showing the format of Validity Entry 370 with Refresh Pending Extension. Validity Entry 370 contains VL_FWD_LINK 374 and VL_REV_LINK 376, as previously discussed. In this example, the validity entry (i.e., Validity Entry 370) is shown with five processes within the same sub-application in 'refresh pending' state. Refresh Pending Entry-Process A 378 shows that Process A was the first referenced for this validity entry. The order of the processes in the RP Extension entries (i.e., entries 384, 386, 388, and 390) indicates that the processes initially referenced the validity entry in the order of A-B-C-D-E. However, subsequent references to the same validity entry occurred in a different order. The 'RP List Order' 382 maintains an LRU/MRU list of the current processes in the Refresh Pending entries. In the example shown at detail 392, process B referenced the validity entry most recently, whereas process D referenced the validity entry least recently (i.e., or oldest reference). The RP Extension is addressed by RP_Extension_Address 380.

Figure 14:
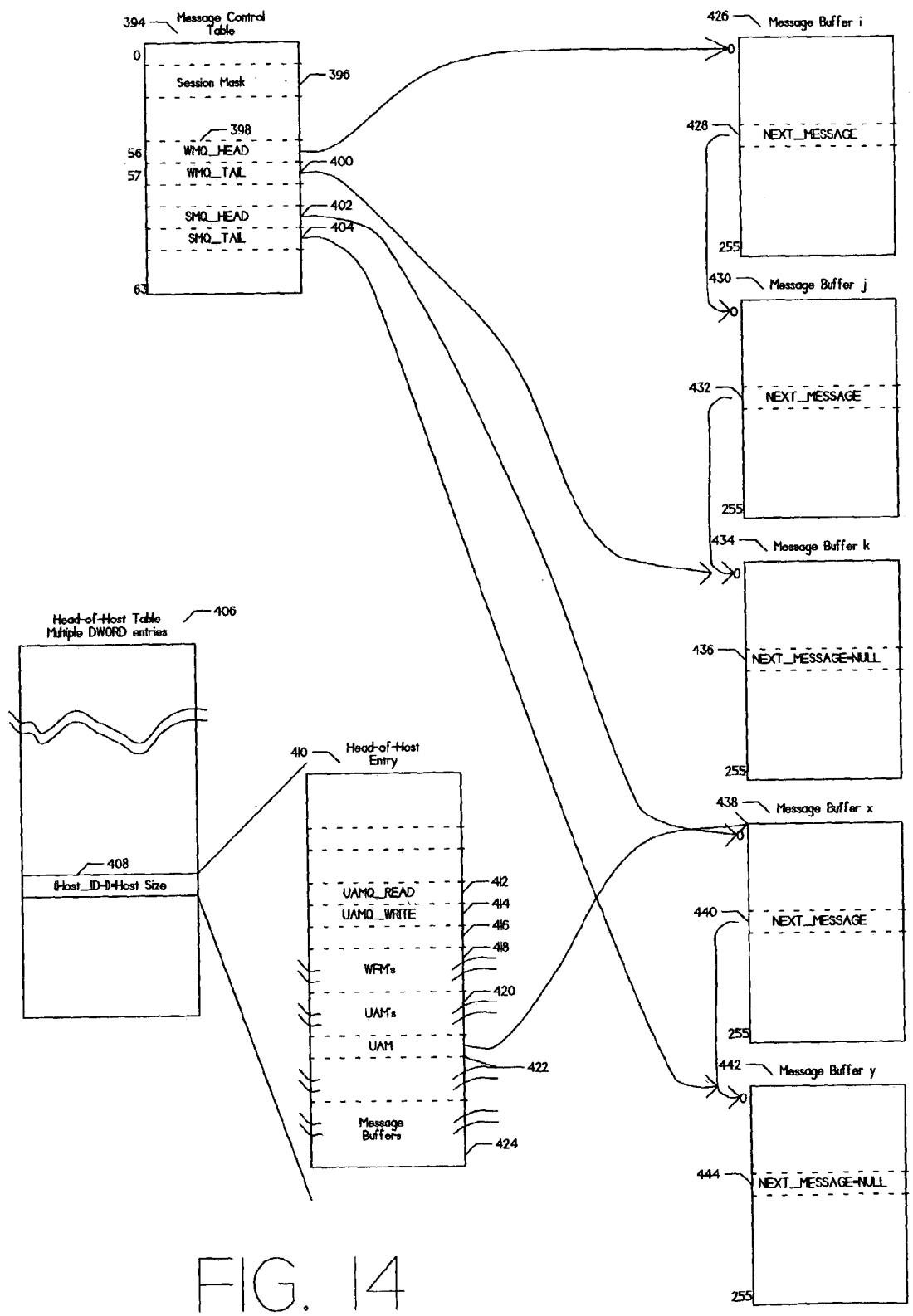
FIG. 14 is a detailed diagram showing operation of messages.

FIG. 14 is a detailed diagram showing the messaging implementation. In the example shown, messages (represented by message buffers i 426, j 430, and k 434) reside on the 'waiting message queue' (WMQ), waiting for a wait-for-message (WFM) from each addressed host. Message Control Table 394 points to Message Buffer i 426 via WMQ_HEAD 398 and to Message Buffer k 434 via WMQ_TAIL 400. The three message buffers are internally linked via NEXT_MESSAGE 428, 432, and 436. Messages (represented by Message Buffers x 438 and y 442) have been sent to the host(s) but have not yet been acknowledged, and both are members of the 'sent message queue' (SMQ). SMQ_HEAD 402 points to Message Buffer x 438 and SMQ_TAIL 404 points to Message to Buffer y 442. Message Buffer 'x' 438 belongs to the host corresponding to the shown head-of-host (HOH) entry, and Message Buffer 'y' 442 belongs to some other host. NEXT_MESSAGE 440 links the two message buffers in the sent message queue.

The message buffers are shown as separate entries for purposes of clarity and are derived from the Message Buffers in the Head-of-Host entries. The collection of Message Buffers in a HOH entry 410 are known as a Host Message Buffer Queue (HMBQ). In the example shown, Message Buffer 'x' 438 resides within the Message Buffers 422 of the shown HOH entry 410. A Head-of-Host Table (HOHT) 406 contains an entry for each of the 64 possible hosts, each table entry contains an array of active Wait-For-Message commands (WFMs), an array of Unacknowledged Messages (UAMs), and an array of message buffers. The Message Control Table (MCT) contains the addresses of the global data structures and test-and-set lock structures required by IHM (inter-host messaging).

Figure 15:
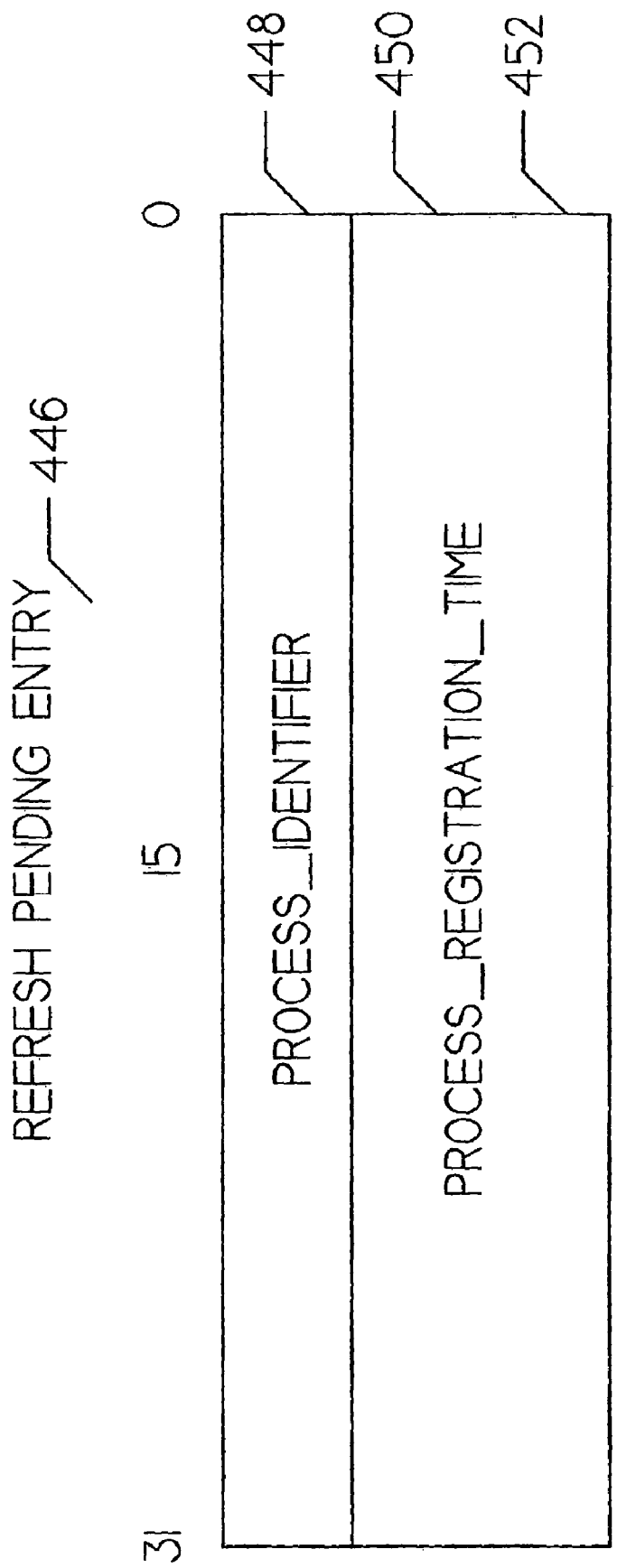
FIG. 15 is a diagram showing the format of the refresh pending entry.

FIG. 15 is a diagram 446 showing the format of the refresh pending entry. The entry consists to three 32-bit words. The first of the 32-bit words 448 contains the PROCESS_IDENTIFIER. The second and third 32-bit words 450 and 452 contain the PROCESS_REGISTRATION_TIME.

Figure 16:
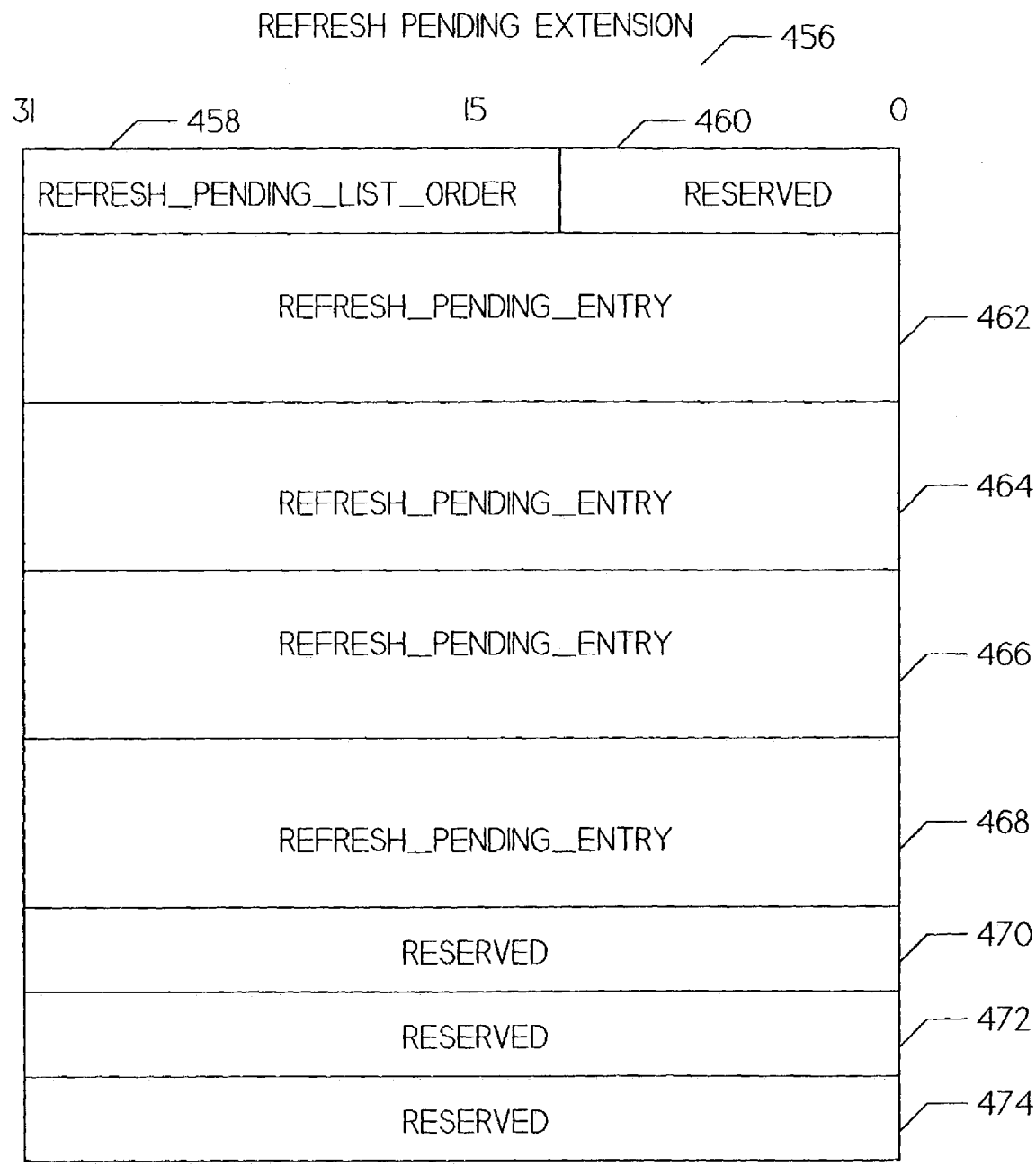
FIG. 16 is a diagram showing the format of the refresh pending entry extension.

FIG. 16 is a diagram 456 showing the format of the refresh pending extension. It consists of a number of 32-bit words. The first is divided into a 12-bit reserved field 460 and a 20-bit REFRESH_PENDING_LIST_ORDER field 458. Each of REFRESH_PENDING_ENTRY fields 462, 464, 466, and 468 consists of three 32-bit words. Remaining words 470, 472 and 474 are reserved.

Figure 17:
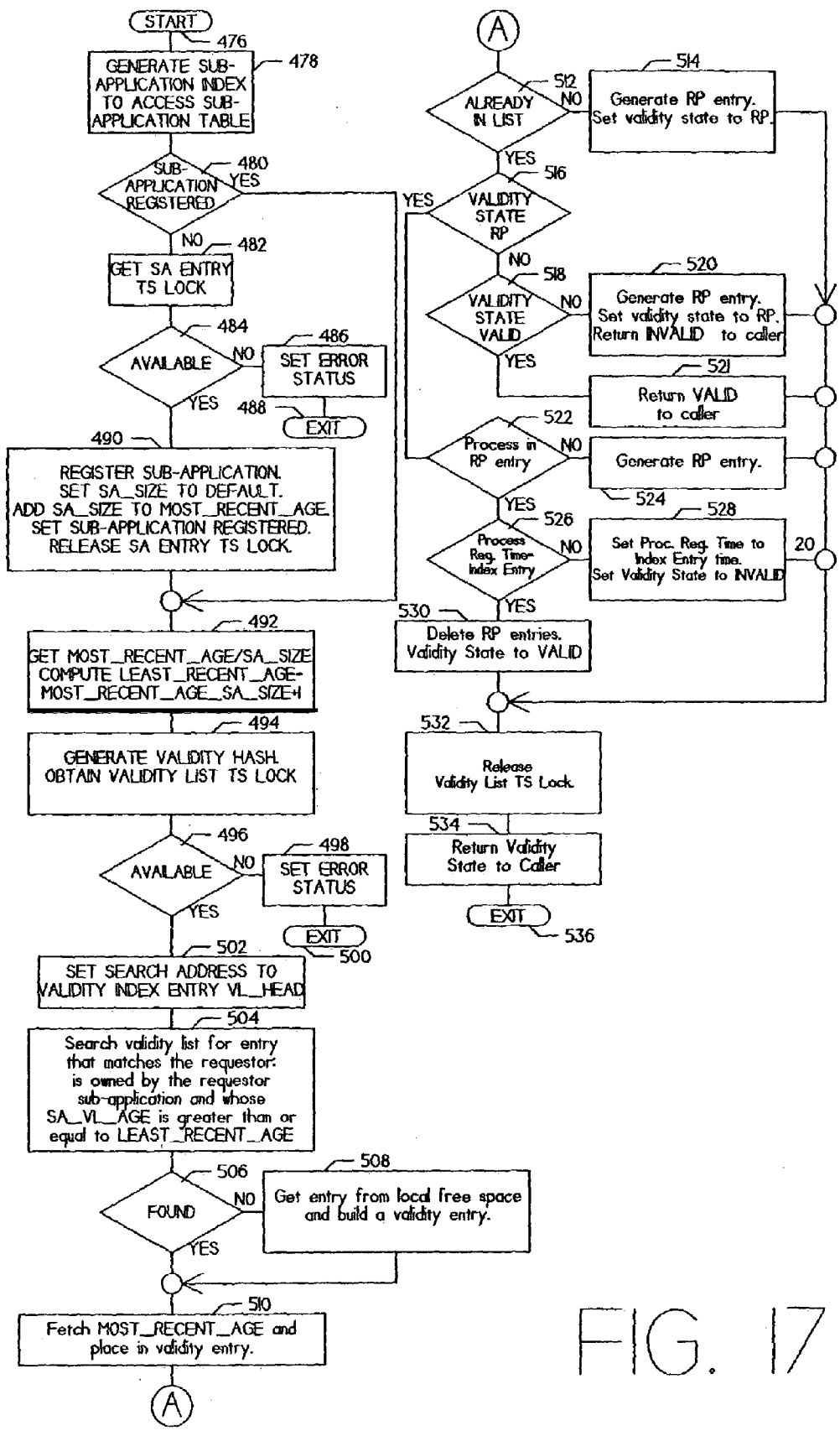
FIG. 17 is a detailed flow chart showing the validate self process.

FIG. 17 is a detailed flow chart showing the process of validating a validity object owned by "self". Entry is via element 476. At element 478 a Sub-Application index value (SA Index) is generated. This index is utilized to access the corresponding entry in the Sub-Application Table to obtain the sub-application registered indicator. If element 480 determines that the sub-application is registered, control is transferred to element 492. If element 480 finds that the sub-application is not registered, element 482 fetches the SA entry TS lock. If element 484 finds it unavailable, element 486 sets the appropriate error status and exits via element 488. Otherwise, element 490 registers the sub-application. This entails setting the sub-application size (SA_SIZE) to the default (currently=500), adding SA_SIZE to MOST_RECENT_AGE and setting sub-application registered. Releasing the SA entry TS Lock completes the registration process.

At element 492, the MOST_RECENT_AGE/SA_SIZE is fetched from the SA entry. From this is computed LEAST_RECENT_AGE=MOST_RECENT_AGE−SA_SIZE+1. The Validity Hash is generated at element 494, which is used to index the Validity Index Table to obtain the Validity List TS Lock. If element 496 determines that it is unavailable, element 498 sets the appropriate error status and exits via element 500.

The search address is set to the Validity Index Entry VL_HEAD by element 502. At element 504, the validity list is searched for a validity entry that matches the requestor, is owned by the requestor sub-application, and whose SA_VL_AGE is greater than or equal to LEAST_RECENT_AGE. If the entry is not found at element 506, control is given to element 508. At that point, an entry is fetched from local free space and used to build a validity entry.

In either case, element 510 fetches the next MOST_RECENT AGE from the SA entry. This is accomplished by using an atomic increment. The MOST_RECENT_AGE is placed into the current validity entry. Element 512 determines if the validity entry was already in the validity list. If not element 514 adds the validity entry to the end of the current validity list. Control is given to element 532.

If element 512 determines that the entry is already in the list, element 516 determines if the validity state is refresh pending. If yes control is given to element 522. If no, control is given to element 518 to determine if validity state is valid. If not, it means that the validity state is undefined, and element 520 generates a refresh pending entry. It sets validity state to refresh pending. An INVALID is returned to the caller, and the Audit Routine is called. Control is given to element 532.

Element 522 determines if the requested process is in a refresh pending entry. If not, element 524 generates a refresh pending entry. Control is then given to element 532. If yes, element 526 determines if the process registration time is the same as the Process Index entry process registration time. If not, element 528 sets the process registration time to the Process index entry time. Furthermore, the validity state is set to INVALID. Control is given to element 532. Otherwise, element 530 deletes all refresh pending entries and sets the validity state to VALID.

Element 532 releases the Validity List TS Lock. Element 534 returns the validity state to the caller. Exit is via element 536.

Figure 18:
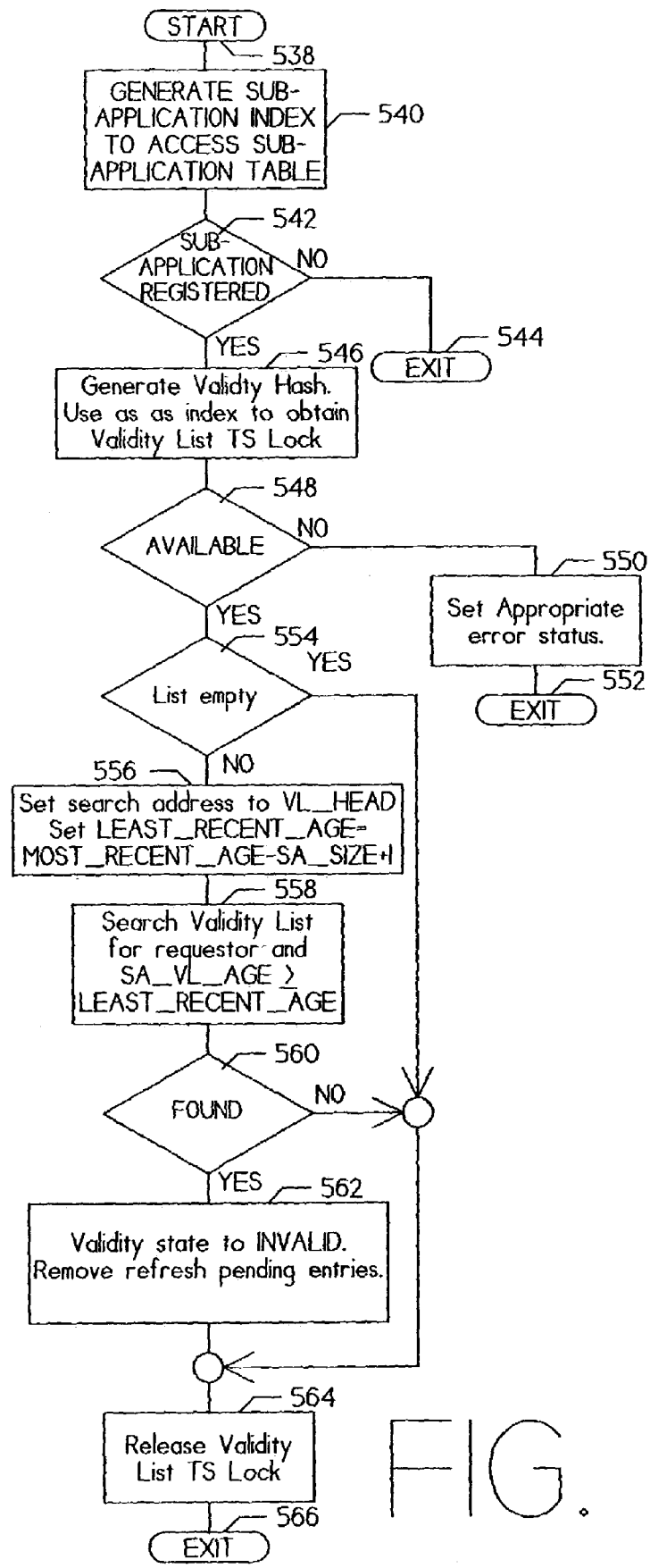
FIG. 18 is a detailed flow chart showing operation of the invalidate self process.

FIG. 18 is a detailed flow diagram showing the operation of the invalidate self process. Entry is via element 538. At element 540, the Sub-Application Index value is generated. This index is used to reference the Sub-Application Table to obtain the sub-application registered indicator. If not registered, element 542 routes control to element 544 for exit.

The validity hash is generated at element 546. This is used as an index to the Validity Index Table to obtain the Validity List TS lock. If unavailable, element 548 gives control to element 550 to set the appropriate error status, and exit is via element 552. Otherwise, element 554 determines whether the list is empty. If so, control is given to element 564.

The search address is set to VL_HEAD by element 556. LEAST_RECENT_AGE is set equal to MOST_RECENT_AGE−SA_SIZE+1. The Validity List is searched for a validity entry that matches the requestor sub-application at element 558, having SA_VL_AGE$^3$ LEAST_RECENT_AGE. If not found, element 560 transfers control to element 564. Otherwise, element 562 changes the validity state to INVALID. Refresh pending entries are removed. Element 564 releases the validity list TS lock. Exit is via element 566.

Figure 19:
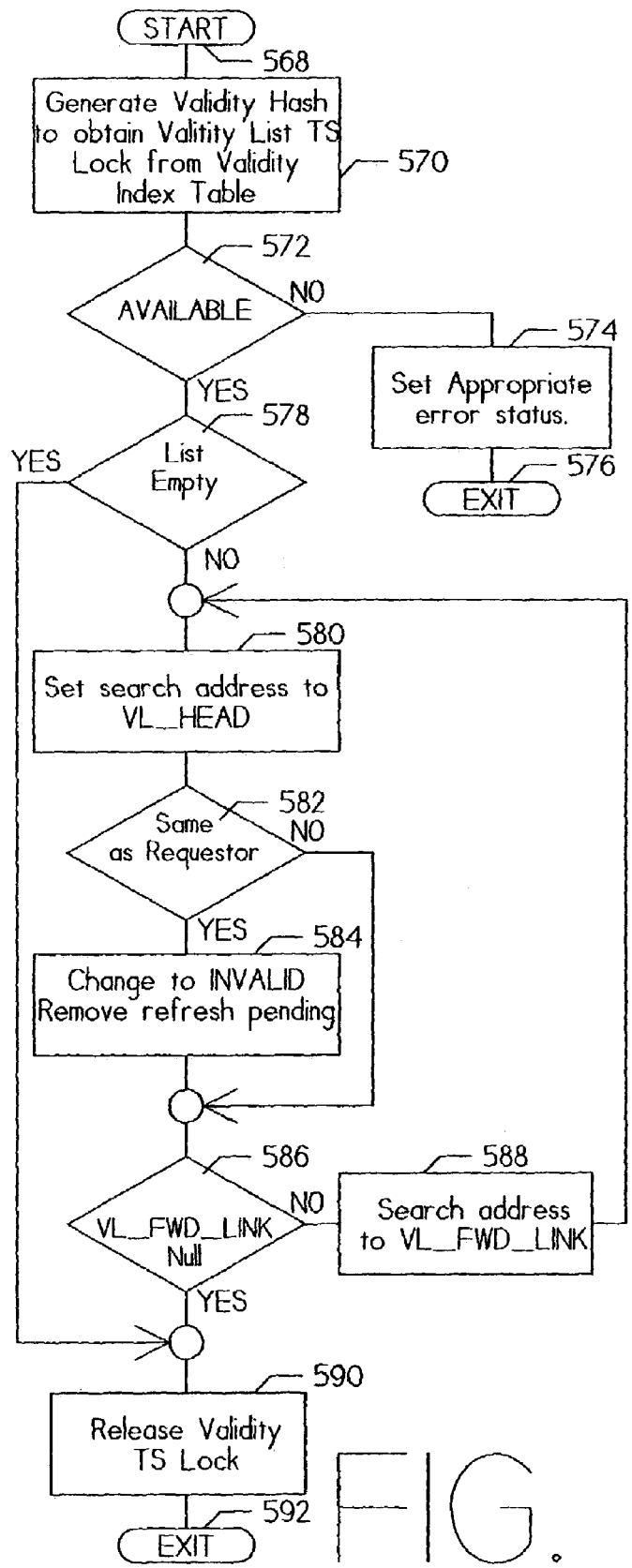
FIG. 19 is a detailed flow chart showing operation of the invalidate others process.

FIG. 19 is a detailed flow chart showing operation of the invalidate others process. Entry is via element 568. At element 570, the validity hash is generated. This is used as an index to the Validity Index Table to obtain the Validity List TS Lock. If unavailable, element 572 routes control to element 574 for setting of the appropriate error status. Exit is via element 576.

Element 578 determines whether the validity list is empty. If yes, control is given to element 590. Otherwise, element 580 sets the search address to VL_HEAD. A determination of whether the object identifier is the same as the requestor and the sub-application is the same as the requestor is made at element 582. If not, control is given to element 586. Otherwise, element 584 changes the validity state to INVALID and removes any refresh pending entries.

A determination of whether VL_FWD_LINK is Null is made at element 586. If yes, control is given to element 590. If no, element 588 sets the search address to VL_FWD_LINK. Control is given to element 580, as shown.

Element 590 releases the Validity List TX lock and exit is via element 592.

Figure 20:
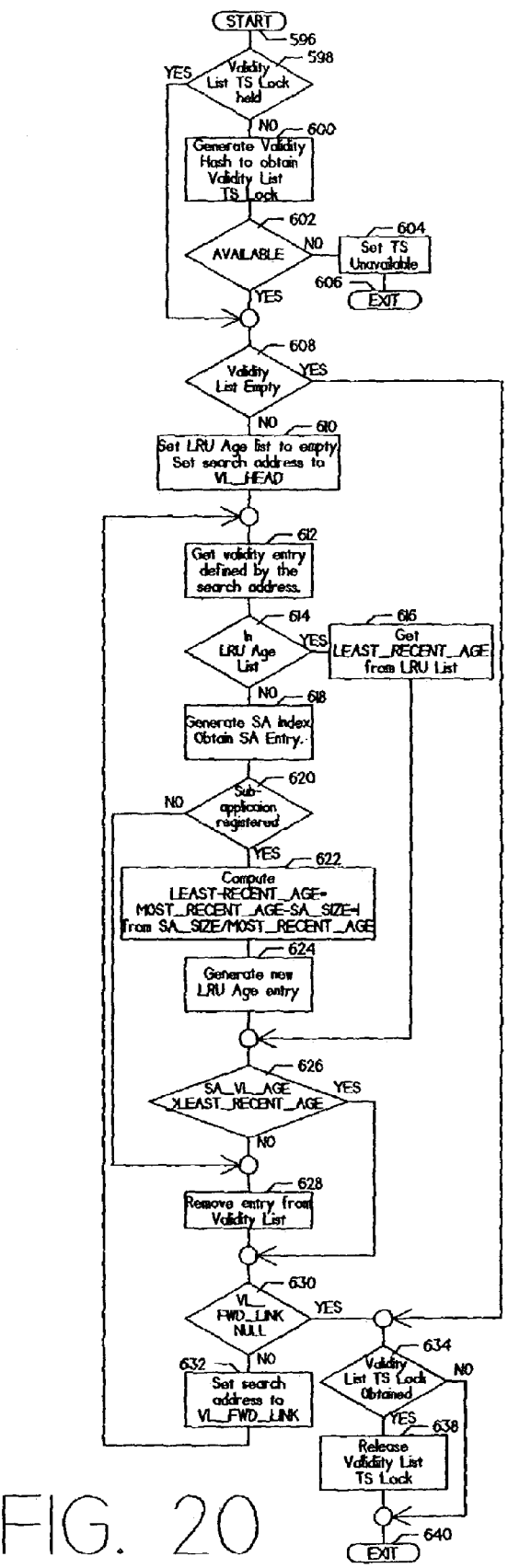
FIG. 20 is a detailed flow chart showing validity list reduction.

FIG. 20 is a detailed flow chart showing the process of validity list reduction. Entrance is via element 596. Element 598 determines if the Validity List TS Lock is already held. If yes, control is transferred to element 608. Otherwise, element 600 generates the Validity Hash. This is used as an index to the Validity Index Table to obtain the Validity List TS Lock. If unavailable, element 602 gives control to element 604 which sets TS unavailable. Element 606 exits and returns to the caller.

A determination of whether the validity list is empty is made by element 608. If empty, control is routed to element 634. Otherwise, element 610 sets the sub-application LRU Age list to empty. The search address is set to VL_HEAD. Element 612 gets the validity entry defined by the search address. Element 614 makes a determination concerning the entry. If the validity entry's sub-application is in the Sub-application LRU AGE list, element 616 gets the LEAST_RECENT_AGE from the Sub-application LRU Age list and routes control to element 626. Otherwise, element 618 generates the Sub-Application Index Value (SA Index) using the sub-application identifier of the validity entry. This is used as an index to the Sub-Application Table to obtain the SA Entry.

Element 620 determines if the sub-application is registered. If not, control is given to element 628. Otherwise, element 622 gets the SA_SIZE/MOST_RECENT_AGE from the sub-application entry to compute the LEAST_RECENT_AGE=MOST_RECENT_AGE−SA_SIZE+1. Note that this computation should not use a TS of the SA entry. A new sub-application LRU Age entry is generated for the current sub-application at element 624. Element 626 determines whether the validity entry SA_VL_AGE$^3$ LEAST_RECENT_AGE. If yes, control is transferred to element 630. Otherwise, element 628 removes the entry from the validity list. If this routine was not called via a background thread, it returns the entry to local free space; else, returns the entry to global free space.

Element 630 determines whether VL_FWD_LINK is Null. If no, element 632 sets the search address to VL_FWD_LINK and control reverts to element 612. If yes, element 634 determines whether the validity list TS lock was obtained by this routine. If yes, element 638 releases the validity list TS lock. Exit is via element 640.

Having thus described the preferred embodiments of the present invention, those of skill in the art will be readily able to adapt the teachings found herein to yet other embodiments within the scope of the claims hereto attached.

We claim:

1. An apparatus comprising:
   a. describing means for describing a service request;
   b. a plurality of commodity instruction processors;
   c. first means responsively coupled to said describing means and to each of said plurality of commodity instruction processors for managing said plurality of commodity instruction processors to honor said service request having a cache memory containing a plurality of entries;
   d. permitting means responsively coupled to said managing means for permitting said managing means to assign said describing means to a selected one of said plurality of commodity instruction processors for said honoring of said service request;
   e. maintaining means responsively coupled to each of said plurality of commodity instruction processors and said managing means for maintaining a list having a plurality of validity entries corresponding to said plurality of entries contained by said cache memory; and
   f. aging means responsively coupled to said maintaining means for aging out various obsolete ones of said plurality of validity entries.

2. An apparatus according to claim 1 wherein one of said plurality validity entries corresponds to said service request.

3. An apparatus according to claim 2 wherein said aging means further comprises a background application.

4. An apparatus according to claim 3 wherein said list further comprises a second plurality of entries corresponding to said describing means including a least recently used entry and a most recently used entry.

5. An apparatus according to claim 4 wherein said aging means deletes said least recently used entry if said second plurality exceeds a given number.

6. An apparatus comprising:
   a. a plurality of commodity instruction processors;
   b. a primary cluster lock server having a cache memory containing a plurality of data entries responsively coupled to each of said plurality of commodity instruction processors which directly manages each of said plurality of commodity instruction processors to honor a service request;
   c. a validity list having a plurality of validity entries located within said primary cluster lock server corresponding to said plurality of data entries; and
   d. an aging facility located within said primary cluster lock server which deletes obsolete ones of said plurality of validity entries.

7. The apparatus of claim 6 wherein certain of said plurality of validity entries are least recently used validity entries and certain others of said plurality of validity entries are most recently used validity entries.

8. The apparatus of claim 7 wherein each of said obsolete ones of said plurality of validity entries is a least recently used validity entry.

9. The apparatus of claim 8 further comprising a user responsively coupled to said primary cluster lock server.

10. The apparatus of claim 9 wherein said user has associated therewith a specific number of said plurality of validity entries including one of said least recently used validity entries and one of said most recently used validity entries.

11. A method of enhancing performance of a data processing system comprising:
    a. maintaining a first plurality of validity entries in a cluster lock server corresponding to a plurality of cache memory entries;
    b. assigning a second plurality of said first plurality of validity entries to a first owner;
    c. establishing a maximum number for said second plurality of said first plurality of validity entries; and
    d. deleting ones of said second plurality of said first plurality of validity entries which exceed said maximum number.

12. A method according to claim 11 wherein one of said second plurality of said first plurality of validity entries further comprises a least recently used validity entry.

13. A method according to claim 12 wherein one of said second plurality of said first plurality of validity entries further comprises a most recently used validity entry.

14. A method according to claim 13 wherein said deleting further comprises deleting said least recently used validity entry.

15. A method according to claim 14 wherein said deleting further comprises deleting in a background application.

16. In a data processing system, the improvement comprising:
    a. a plurality of commodity instruction processors;
    b. a first cluster lock server responsively coupled to each of said plurality of commodity instruction processors which directly manages said plurality of commodity instruction processors having a first internal cache memory and a first Input/Output processor;
    c. a validity list located within said first cluster lock server having a plurality of validity entries corresponding to said first internal cache memory; and
    d. a facility which deletes one of said plurality of validity entries.

17. The improvement according to claim 16 wherein one of said plurality of validity entries further comprises a least recently used validity entry.

18. The improvement according to claim 17 wherein one of said plurality of validity entries further comprises a most recently used validity entry.

19. The improvement according to claim 18 said facility deletes said least recently used validity entry.

20. The improvement according to claim 19 wherein a portion of said plurality of validity entries including said least recently used validity entry and said most recently used validity entry is associated with an owner.

* * * * *